US012657566B2

(12) United States Patent
Taheri

(10) Patent No.: US 12,657,566 B2
(45) Date of Patent: Jun. 16, 2026

(54) GENAI LETTER OF CONFIRMATION OF BENEFITS

(71) Applicant: The Toronto-Dominion Bank, Toronto (CA)

(72) Inventor: Shahriar Taheri, Newmarket (CA)

(73) Assignee: The Toronto-Dominion Bank, Toronto (CA)

( * ) Notice: Subject to any disclaimer, the term of this patent is extended or adjusted under 35 U.S.C. 154(b) by 16 days.

(21) Appl. No.: 18/481,971

(22) Filed: Oct. 5, 2023

(65) Prior Publication Data

US 2025/0117769 A1     Apr. 10, 2025

(51) Int. Cl.
*G06Q 30/00* (2023.01)
*G06F 40/20* (2020.01)
*G06Q 20/24* (2012.01)

(52) U.S. Cl.
CPC ............ *G06Q 20/24* (2013.01); *G06F 40/20* (2020.01)

(58) Field of Classification Search
USPC ........... 705/44, 1.1, 35, 45, 39, 40; 713/176; 235/280
See application file for complete search history.

(56) References Cited

U.S. PATENT DOCUMENTS

| | | | |
|---|---|---|---|
| 8,682,784 | B2 | 3/2014 | Schleicher |
| 9,864,982 | B2 | 1/2018 | Bristow et al. |
| 9,922,338 | B2 | 3/2018 | Ovick et al. |
| 9,965,768 | B1 | 5/2018 | Doane et al. |
| 9,990,646 | B2 | 6/2018 | Salmon et al. |
| 10,068,226 | B2 | 9/2018 | Chandrasekaran |
| 10,157,400 | B1 | 12/2018 | Georgi |
| 10,163,085 | B2 | 12/2018 | D'Agostino et al. |
| 10,178,246 | B1 | 1/2019 | Horvath et al. |
| 10,181,114 | B2 | 1/2019 | Tseretopoulos et al. |
| 10,296,908 | B2 | 5/2019 | Narayanan et al. |
| 10,339,931 | B2 | 7/2019 | Tseretopoulos et al. |
| 10,346,824 | B2 | 7/2019 | Chan et al. |
| 10,360,303 | B2 | 7/2019 | Volkovs et al. |
| 10,366,387 | B2 | 7/2019 | Aabye et al. |
| 10,405,146 | B1 | 9/2019 | Kuruvilla et al. |
| 10,438,206 | B2 | 10/2019 | Jivraj et al. |
| 10,440,196 | B2 | 10/2019 | Horvath et al. |
| 10,440,197 | B2 | 10/2019 | Horvath et al. |

(Continued)

OTHER PUBLICATIONS ip.com NPL Search History.*
Heglin et al., "Auto-Adjudication Process via Machine Learning," U.S. Appl. No. 19/053,942, filed Feb. 14, 2025.

*Primary Examiner* — John H. Holly

(57) ABSTRACT

An example operation may include one or more of storing a data store of credit card documentation, conversing with a user via a chatbot within a chat window of a software application, wherein the conversing comprises receiving natural language inputs with requests for information about a payment card, identifying a benefit obtained by the user based on the conversation, executing a large language model (LLM) on the identified benefit and the data store of the credit card documentation to generate a letter of confirmation, and generating an electronic message with the letter of confirmation attached, and transmitting the electronic message to a user device. The example operation may further include an AI agent that performs an action based on the digital message.

20 Claims, 21 Drawing Sheets

(56) References Cited

U.S. PATENT DOCUMENTS

| | | | |
|---|---|---|---|
| 10,460,748 B2 | 10/2019 | Tseretopoulos et al. | |
| 10,482,675 B1 | 11/2019 | Sutter et al. | |
| 10,628,843 B2 | 4/2020 | Bell et al. | |
| 10,650,398 B2 | 5/2020 | Kim et al. | |
| 10,659,400 B2 | 5/2020 | Moon et al. | |
| 10,698,902 B2 | 6/2020 | Tseretopoulos et al. | |
| 10,706,635 B2 | 7/2020 | Sutter et al. | |
| 10,708,721 B2 | 7/2020 | Kuruvilla et al. | |
| 10,728,259 B2 | 7/2020 | McCarter et al. | |
| 10,733,623 B2 | 8/2020 | Ovick et al. | |
| 10,740,736 B2 | 8/2020 | Bhatt et al. | |
| 10,776,619 B2 | 9/2020 | Collinson et al. | |
| 10,795,940 B2 | 10/2020 | Choi et al. | |
| 10,810,574 B1 | 10/2020 | Wilson et al. | |
| 10,824,941 B2 | 11/2020 | Volkovs et al. | |
| 10,831,923 B2 | 11/2020 | Dunjic et al. | |
| 10,832,047 B2 | 11/2020 | Moghtadai | |
| 10,862,897 B2 | 12/2020 | D'Agostino et al. | |
| 10,867,292 B2 | 12/2020 | Lin et al. | |
| 10,867,293 B2 | 12/2020 | Bristow et al. | |
| 10,878,816 B2 | 12/2020 | Tseretopoulos et al. | |
| 10,902,220 B2 | 1/2021 | Lozon et al. | |
| 10,922,665 B2 | 2/2021 | Miller et al. | |
| 10,943,605 B2 | 3/2021 | Tseretopoulos et al. | |
| 10,977,617 B2 | 4/2021 | Tseretopoulos et al. | |
| 10,977,623 B2 | 4/2021 | Delaney | |
| 11,004,187 B2 | 5/2021 | Kuruvilla et al. | |
| 11,017,028 B2 | 5/2021 | Dunjic et al. | |
| 11,030,412 B2 | 6/2021 | Shanmugam et al. | |
| 11,030,415 B2 | 6/2021 | Volkovs et al. | |
| 11,055,924 B2 | 7/2021 | Navarro et al. | |
| 11,061,638 B2 | 7/2021 | Lam | |
| 11,070,448 B2 | 7/2021 | Miller et al. | |
| 11,087,314 B2 | 8/2021 | Gandhi et al. | |
| 11,100,168 B2 | 8/2021 | Miller et al. | |
| 11,140,143 B2 | 10/2021 | Moon et al. | |
| 11,144,921 B2 | 10/2021 | Dunjic et al. | |
| 11,144,998 B2 | 10/2021 | Kuruvilla et al. | |
| 11,145,169 B2 | 10/2021 | Pratten et al. | |
| 11,151,547 B2 | 10/2021 | Jamkhedkar et al. | |
| 11,159,457 B2 | 10/2021 | Liang et al. | |
| 11,170,161 B2 | 11/2021 | Goyal et al. | |
| 11,182,860 B2 | 11/2021 | Kuruvilla et al. | |
| 11,190,464 B2 | 11/2021 | Akkiraju et al. | |
| 11,196,687 B1 * | 12/2021 | Mall | G06F 40/20 |
| 11,200,328 B2 | 12/2021 | Shpurov et al. | |
| 11,200,411 B2 | 12/2021 | Rizvi et al. | |
| 11,200,506 B2 | 12/2021 | Wu et al. | |
| 11,206,227 B2 | 12/2021 | Akkiraju et al. | |
| 11,210,857 B2 | 12/2021 | Rizvi et al. | |
| 11,222,286 B2 | 1/2022 | Choe et al. | |
| 11,232,304 B2 | 1/2022 | Navarro et al. | |
| 11,276,257 B2 | 3/2022 | Moghtadai et al. | |
| 11,295,727 B2 | 4/2022 | Mei et al. | |
| 11,303,642 B2 | 4/2022 | Dunjic et al. | |
| 11,334,574 B2 | 5/2022 | Caputo et al. | |
| 11,334,864 B2 | 5/2022 | Bloys et al. | |
| 11,347,744 B2 | 5/2022 | Tseretopoulos et al. | |
| 11,349,871 B2 | 5/2022 | Moon et al. | |
| 11,354,442 B2 | 6/2022 | Haldenby et al. | |
| 11,354,650 B2 | 6/2022 | Kurylko et al. | |
| 11,354,697 B2 | 6/2022 | Givol et al. | |
| 11,361,566 B2 | 6/2022 | Collinson et al. | |
| 11,373,229 B2 | 6/2022 | Tseretopoulos et al. | |
| 11,392,647 B2 | 7/2022 | Asthana et al. | |
| 11,392,776 B2 | 7/2022 | Lozon et al. | |
| 11,393,020 B2 | 7/2022 | Mathew et al. | |
| 11,394,668 B1 | 7/2022 | Subbunarayanan et al. | |
| 11,397,765 B2 | 7/2022 | Volkovs et al. | |
| 11,409,811 B2 | 8/2022 | D'Agostino | |
| 11,411,734 B2 | 8/2022 | Shpurov et al. | |
| 11,430,242 B2 | 8/2022 | Moghtadai | |
| 11,436,809 B2 | 9/2022 | Rizvi et al. | |
| 11,451,496 B1 | 9/2022 | Zhang et al. | |
| 11,451,669 B1 | 9/2022 | Navarro et al. | |
| 11,469,878 B2 | 10/2022 | Shpurov et al. | |
| 11,470,091 B2 | 10/2022 | McCarter et al. | |
| 11,470,143 B2 | 10/2022 | Joheb et al. | |
| 11,475,059 B2 | 10/2022 | Liu et al. | |
| 11,475,251 B2 | 10/2022 | Morin et al. | |
| 11,477,265 B2 | 10/2022 | McPhee et al. | |
| 11,507,622 B2 | 11/2022 | Grebenisan et al. | |
| 11,507,868 B2 | 11/2022 | Kwong et al. | |
| 11,546,345 B2 | 1/2023 | D'Agostino et al. | |
| 11,580,762 B2 | 2/2023 | Rizvi et al. | |
| 11,600,064 B2 | 3/2023 | Navarro et al. | |
| 11,604,899 B2 | 3/2023 | Haldenby et al. | |
| 11,620,741 B2 | 4/2023 | Kuruvilla et al. | |
| 11,632,311 B2 | 4/2023 | Miller et al. | |
| 11,651,100 B2 | 5/2023 | Dunjic et al. | |
| 11,663,488 B2 | 5/2023 | Volkovs et al. | |
| 11,671,536 B2 | 6/2023 | Navarro et al. | |
| 11,687,995 B2 | 6/2023 | Tseretopoulos et al. | |
| 11,689,484 B2 | 6/2023 | Moon et al. | |
| 11,699,431 B2 | 7/2023 | Shepal | |
| 11,704,782 B2 | 7/2023 | Wakim et al. | |
| 11,710,479 B1 | 7/2023 | Shenoy et al. | |
| 11,741,305 B2 | 8/2023 | Skaljin et al. | |
| 11,743,210 B2 | 8/2023 | Moon et al. | |
| 11,748,400 B2 | 9/2023 | Volkovs et al. | |
| 11,756,388 B2 | 9/2023 | Pratten et al. | |
| 11,777,918 B2 | 10/2023 | Moon et al. | |
| 11,782,935 B2 | 10/2023 | Caputo et al. | |
| 11,789,909 B2 | 10/2023 | Grebenisan et al. | |
| 11,790,012 B2 | 10/2023 | D'Agostino | |
| 11,790,354 B2 | 10/2023 | Gandhi et al. | |
| 11,797,962 B2 | 10/2023 | Jones et al. | |
| 11,809,486 B2 | 11/2023 | Liu et al. | |
| 11,809,577 B2 | 11/2023 | Begg et al. | |
| 11,811,826 B2 | 11/2023 | Moon et al. | |
| 11,842,252 B2 | 12/2023 | Kuang et al. | |
| 11,875,398 B2 | 1/2024 | Pratten et al. | |
| 11,880,811 B2 | 1/2024 | Pawelkiewicz et al. | |
| 11,886,764 B2 | 1/2024 | Lam | |
| 11,928,112 B2 | 3/2024 | Dunjic et al. | |
| 11,941,525 B2 | 3/2024 | Morin et al. | |
| 11,941,703 B2 | 3/2024 | Kuruvilla et al. | |
| 11,955,117 B2 | 4/2024 | McDermid et al. | |
| 11,966,491 B2 | 4/2024 | D'Agostino | |
| 11,978,085 B2 | 5/2024 | Rai et al. | |
| 11,978,090 B2 | 5/2024 | Navarro et al. | |
| 11,985,153 B2 | 5/2024 | Karl | |
| 11,995,121 B2 | 5/2024 | Volkovs et al. | |
| 12,008,315 B2 | 6/2024 | Miller et al. | |
| 12,014,303 B2 | 6/2024 | Carvalho et al. | |
| 12,019,594 B2 | 6/2024 | Floyd et al. | |
| 12,021,874 B2 | 6/2024 | Dunjic et al. | |
| 12,039,535 B2 | 7/2024 | Dunjic et al. | |
| 12,052,363 B2 | 7/2024 | Shpurov et al. | |
| 12,061,652 B2 | 8/2024 | Miller et al. | |
| 12,067,130 B2 | 8/2024 | Shpurov et al. | |
| 12,067,580 B2 | 8/2024 | Jeske et al. | |
| 12,079,351 B2 | 9/2024 | Begg et al. | |
| 12,106,220 B2 | 10/2024 | Volkovs et al. | |
| 12,111,793 B2 | 10/2024 | Grebenisan et al. | |
| 12,124,925 B2 | 10/2024 | Rho et al. | |
| 12,136,079 B2 | 11/2024 | Jones et al. | |
| 12,164,542 B1 | 12/2024 | Rahman et al. | |
| 12,169,693 B2 | 12/2024 | Lu | |
| 12,182,800 B2 | 12/2024 | Navarro et al. | |
| 12,198,109 B2 | 1/2025 | Abbas | |
| 12,198,510 B2 | 1/2025 | Pratten et al. | |
| 12,210,534 B2 | 1/2025 | Cashion et al. | |
| 12,211,274 B2 | 1/2025 | Ma et al. | |
| 12,217,011 B2 | 2/2025 | Luo et al. | |
| 12,223,549 B2 | 2/2025 | Bouëttéet al. | |
| 12,229,690 B2 | 2/2025 | Stanevich et al. | |
| 12,254,512 B2 | 3/2025 | Heglin et al. | |
| 12,282,785 B2 | 4/2025 | Karbasi et al. | |
| 12,288,236 B2 | 4/2025 | Volkovs et al. | |
| 12,299,149 B2 | 5/2025 | Nikoghossian et al. | |
| 12,316,715 B2 | 5/2025 | Taheri et al. | |
| 12,321,861 B2 | 6/2025 | Volkovs et al. | |
| 12,326,856 B2 | 6/2025 | Mohammed et al. | |

(56) References Cited

U.S. PATENT DOCUMENTS

| | | |
|---|---|---|
| 12,333,354 B2 | 6/2025 | Mohammed et al. |
| 12,353,969 B2 | 7/2025 | Kuang et al. |
| 12,354,094 B2 | 7/2025 | Jones et al. |
| 12,373,795 B2 | 7/2025 | Misler et al. |
| 2005/0045728 A1 | 3/2005 | Kargman |
| 2005/0060296 A1* | 3/2005 | Whitby ............... G06F 16/9535 |
| 2005/0235037 A1* | 10/2005 | Tropartz .............. G06Q 10/107 |
| | | 455/466 |
| 2010/0262537 A1 | 10/2010 | Park |
| 2011/0060631 A1 | 3/2011 | Grossman et al. |
| 2011/0060634 A1 | 3/2011 | Grossman et al. |
| 2013/0024371 A1 | 1/2013 | Hariramani et al. |
| 2013/0191213 A1 | 7/2013 | Beck et al. |
| 2014/0122618 A1 | 5/2014 | Duan |
| 2018/0268818 A1 | 9/2018 | Schoenmackers et al. |
| 2018/0278552 A1 | 9/2018 | Quock et al. |
| 2019/0172045 A1 | 6/2019 | Dunjic et al. |
| 2019/0197527 A1 | 6/2019 | Agarwalla et al. |
| 2019/0205465 A1* | 7/2019 | Kulkarni ............... G06F 16/345 |
| 2019/0340595 A1 | 11/2019 | Bhargava |
| 2020/0058068 A1 | 2/2020 | Gandhi et al. |
| 2020/0167805 A1 | 5/2020 | Ekambaram et al. |
| 2020/0387550 A1 | 12/2020 | Cappetta et al. |
| 2021/0027160 A1 | 1/2021 | Volkovs et al. |
| 2021/0035239 A1 | 2/2021 | Srivastava et al. |
| 2021/0037040 A1 | 2/2021 | Aleks et al. |
| 2021/0081442 A1* | 3/2021 | Ganu ..................... G06N 20/00 |
| 2021/0117893 A1 | 4/2021 | Sohum et al. |
| 2021/0117951 A1 | 4/2021 | Son et al. |
| 2021/0192496 A1 | 6/2021 | Gregovic |
| 2021/0232950 A1 | 7/2021 | Kono |
| 2021/0264461 A1 | 8/2021 | Fam |
| 2021/0312900 A1* | 10/2021 | Lalithsena ............. G10L 25/63 |
| 2021/0365482 A1 | 11/2021 | Kim |
| 2021/0407016 A1 | 12/2021 | Kuruvilla et al. |
| 2022/0051228 A1 | 2/2022 | Guo et al. |
| 2022/0058489 A1 | 2/2022 | Volkovs et al. |
| 2022/0058512 A1 | 2/2022 | Noorizadeh et al. |
| 2022/0075605 A1 | 3/2022 | Iyer et al. |
| 2022/0076666 A1 | 3/2022 | Trehan |
| 2022/0108069 A1 | 4/2022 | Lee |
| 2022/0157094 A1 | 5/2022 | Moghtadai et al. |
| 2022/0172083 A1 | 6/2022 | Wu et al. |
| 2022/0172246 A1 | 6/2022 | Melzer et al. |
| 2022/0188697 A1 | 6/2022 | Seth |
| 2022/0188705 A1 | 6/2022 | Davoodi et al. |
| 2022/0198411 A1 | 6/2022 | Jones et al. |
| 2022/0198432 A1 | 6/2022 | Jones et al. |
| 2022/0198445 A1 | 6/2022 | Jones et al. |
| 2022/0207295 A1 | 6/2022 | Stanevich et al. |
| 2022/0207430 A1 | 6/2022 | Dickie et al. |
| 2022/0207432 A1 | 6/2022 | Whelan et al. |
| 2022/0207606 A1 | 6/2022 | Dickie et al. |
| 2022/0245060 A1 | 8/2022 | Kathuria et al. |
| 2022/0270155 A1 | 8/2022 | Volkovs et al. |
| 2022/0277213 A1 | 9/2022 | Braviner et al. |
| 2022/0277227 A1 | 9/2022 | Yu et al. |
| 2022/0277323 A1 | 9/2022 | Whelan et al. |
| 2022/0284450 A1 | 9/2022 | Asta et al. |
| 2022/0300903 A1 | 9/2022 | Huang et al. |
| 2022/0300998 A1 | 9/2022 | Glazier et al. |
| 2022/0309250 A1 | 9/2022 | Das et al. |
| 2022/0309573 A1 | 9/2022 | Mathew et al. |
| 2022/0318573 A1 | 10/2022 | Smith et al. |
| 2022/0318617 A1 | 10/2022 | Wong et al. |
| 2022/0327397 A1 | 10/2022 | Braviner et al. |
| 2022/0327430 A1 | 10/2022 | Zuberi et al. |
| 2022/0327431 A1 | 10/2022 | Braviner et al. |
| 2022/0327432 A1 | 10/2022 | Gutierrez Bugarin et al. |
| 2022/0327625 A1 | 10/2022 | Leung et al. |
| 2022/0335223 A1 | 10/2022 | Tripathi et al. |
| 2022/0335468 A1 | 10/2022 | Sherif et al. |
| 2022/0335718 A1 | 10/2022 | Ma et al. |
| 2022/0343422 A1 | 10/2022 | Zuberi et al. |
| 2022/0366064 A1 | 11/2022 | Nikoghossian et al. |
| 2022/0383301 A1 | 12/2022 | Jones et al. |
| 2022/0383313 A1 | 12/2022 | Jones et al. |
| 2022/0383314 A1 | 12/2022 | Jones et al. |
| 2022/0405299 A1 | 12/2022 | Leung et al. |
| 2022/0414495 A1 | 12/2022 | Stanevich et al. |
| 2023/0006809 A1 | 1/2023 | Shpurov et al. |
| 2023/0007075 A1 | 1/2023 | Mcphee et al. |
| 2023/0011451 A1 | 1/2023 | Lu |
| 2023/0012110 A1 | 1/2023 | Fish et al. |
| 2023/0033328 A1 | 2/2023 | Pal |
| 2023/0034344 A1 | 2/2023 | Jain |
| 2023/0048437 A1 | 2/2023 | Karbasi et al. |
| 2023/0083899 A1 | 3/2023 | Gandouet et al. |
| 2023/0085061 A1 | 3/2023 | Ma et al. |
| 2023/0086653 A1 | 3/2023 | Zykh et al. |
| 2023/0107703 A1 | 4/2023 | Zhang et al. |
| 2023/0113752 A1 | 4/2023 | Jorlett et al. |
| 2023/0119108 A1 | 4/2023 | Volkovs et al. |
| 2023/0131935 A1 | 4/2023 | Volkovs et al. |
| 2023/0133373 A1 | 5/2023 | Mcgonnell et al. |
| 2023/0153461 A1 | 5/2023 | Kalra et al. |
| 2023/0188480 A1 | 6/2023 | Menon et al. |
| 2023/0195734 A1 | 6/2023 | Cashion et al. |
| 2023/0196406 A1 | 6/2023 | Gandouet et al. |
| 2023/0244917 A1 | 8/2023 | Loaiza Ganem et al. |
| 2023/0244962 A1 | 8/2023 | Volkovs et al. |
| 2023/0245234 A1 | 8/2023 | Sumant |
| 2023/0252301 A1 | 8/2023 | Volkovs et al. |
| 2023/0259883 A1 | 8/2023 | Misler et al. |
| 2023/0267367 A1 | 8/2023 | Volkovs et al. |
| 2023/0267475 A1 | 8/2023 | Navarro et al. |
| 2023/0274086 A1 | 8/2023 | Tunstall-Pedoe et al. |
| 2023/0274094 A1 | 8/2023 | Tunstall-Pedoe et al. |
| 2023/0306434 A1 | 9/2023 | Dunjic et al. |
| 2023/0316485 A1 | 10/2023 | Wakim et al. |
| 2023/0318994 A1 | 10/2023 | Moon et al. |
| 2023/0336615 A1 | 10/2023 | Joheb et al. |
| 2023/0342481 A1 | 10/2023 | Nikoghossian et al. |
| 2023/0344814 A1 | 10/2023 | Moon et al. |
| 2023/0351116 A1 | 11/2023 | Skaljin et al. |
| 2023/0368048 A1 | 11/2023 | Yang et al. |
| 2023/0377047 A1 | 11/2023 | Bouëtté al. |
| 2023/0385693 A1 | 11/2023 | Cresswell et al. |
| 2023/0385694 A1 | 11/2023 | Cresswell et al. |
| 2023/0386190 A1 | 11/2023 | Cresswell et al. |
| 2023/0394452 A1 | 12/2023 | Jones et al. |
| 2023/0401192 A1 | 12/2023 | Yang et al. |
| 2023/0401553 A1 | 12/2023 | Navarro et al. |
| 2023/0401572 A1 | 12/2023 | Navarro et al. |
| 2023/0419302 A1 | 12/2023 | Navarro et al. |
| 2023/0419402 A1 | 12/2023 | Ghelichi et al. |
| 2024/0020534 A1 | 1/2024 | Perez Vallejo et al. |
| 2024/0062117 A1 | 2/2024 | Kuang et al. |
| 2024/0106851 A1 | 3/2024 | Kennedy et al. |
| 2024/0119346 A1 | 4/2024 | Chang et al. |
| 2024/0126575 A1 | 4/2024 | Kiriakou et al. |
| 2024/0127036 A1 | 4/2024 | Zuberi et al. |
| 2024/0127214 A1 | 4/2024 | Wander et al. |
| 2024/0161184 A1 | 5/2024 | Heglin et al. |
| 2024/0193562 A1 | 6/2024 | Pratten et al. |
| 2024/0202756 A1 | 6/2024 | Karl et al. |
| 2024/0203405 A1 | 6/2024 | McDermid et al. |
| 2024/0211732 A1 | 6/2024 | Wander et al. |
| 2024/0212049 A1 | 6/2024 | Ghelichi et al. |
| 2024/0220653 A1 | 7/2024 | D'Agostino |
| 2024/0232614 A1 | 7/2024 | Esmaeili et al. |
| 2024/0232950 A1 | 7/2024 | Navarro et al. |
| 2024/0249310 A1 | 7/2024 | Rai et al. |
| 2024/0256903 A1 | 8/2024 | Ens et al. |
| 2024/0256904 A1 | 8/2024 | Leung et al. |
| 2024/0256968 A1 | 8/2024 | Hosseinzadeh et al. |
| 2024/0265055 A1 | 8/2024 | Purkayastha |
| 2024/0281467 A1 | 8/2024 | Volkovs et al. |
| 2024/0281808 A1 | 8/2024 | Vouitsis et al. |
| 2024/0281818 A1 | 8/2024 | Golestan Irani et al. |
| 2024/0289645 A1 | 8/2024 | Makhijani et al. |
| 2024/0289876 A1 | 8/2024 | Mathew et al. |
| 2024/0303423 A1 | 9/2024 | Fabian et al. |
| 2024/0303551 A1 | 9/2024 | Li et al. |

(56)     References Cited

U.S. PATENT DOCUMENTS

| 2024/0304182 A1 | 9/2024 | Hamilton et al. |
| 2024/0330772 A1 | 10/2024 | Cresswell et al. |
| 2024/0330809 A1 | 10/2024 | Carvalho et al. |
| 2024/0338520 A1 | 10/2024 | Misler et al. |
| 2024/0346242 A1 | 10/2024 | Jain |
| 2024/0346338 A1 | 10/2024 | Desai et al. |
| 2024/0370880 A1 | 11/2024 | Jeske et al. |
| 2024/0370881 A1 | 11/2024 | Jeske et al. |
| 2024/0385838 A1 | 11/2024 | Yu et al. |
| 2024/0386295 A1 | 11/2024 | Yu et al. |
| 2024/0386325 A1 | 11/2024 | Yu et al. |
| 2024/0386326 A1 | 11/2024 | Yu et al. |
| 2024/0386427 A1 | 11/2024 | Abbas et al. |
| 2024/0394569 A1 | 11/2024 | Farhadi Hassan Kiadeh et al. |
| 2024/0394588 A1 | 11/2024 | Heglan et al. |
| 2024/0403702 A1 | 12/2024 | Deljavan Farshi |
| 2024/0403862 A1 | 12/2024 | Abbas et al. |
| 2024/0412069 A1 | 12/2024 | Volkovs et al. |
| 2024/0412078 A1 | 12/2024 | Ghelichi et al. |
| 2024/0412083 A1 | 12/2024 | Starszyk et al. |
| 2024/0419978 A1 | 12/2024 | Stein et al. |
| 2024/0420010 A1 | 12/2024 | Cirulis et al. |
| 2024/0420011 A1 | 12/2024 | Cirulis et al. |
| 2024/0428283 A1 | 12/2024 | Belbahri et al. |
| 2025/0006072 A1 | 1/2025 | Hasson et al. |
| 2025/0013363 A1 | 1/2025 | Estoesta et al. |
| 2025/0013697 A1 | 1/2025 | Estoesta et al. |
| 2025/0013927 A1 | 1/2025 | Rho et al. |
| 2025/0014010 A1 | 1/2025 | Jones et al. |
| 2025/0014052 A1 | 1/2025 | Bhattacharjee et al. |
| 2025/0028852 A1 | 1/2025 | Chowanski et al. |
| 2025/0028934 A1 | 1/2025 | Wong et al. |
| 2025/0029012 A1 | 1/2025 | Rho et al. |
| 2025/0045601 A1 | 2/2025 | Zuberi et al. |
| 2025/0053387 A1 | 2/2025 | Wang et al. |
| 2025/0068646 A1 | 2/2025 | Rahman et al. |
| 2025/0068829 A1 | 2/2025 | Brdiczka et al. |
| 2025/0068853 A1 | 2/2025 | Lu |
| 2025/0069063 A1 | 2/2025 | Navarro et al. |
| 2025/0077187 A1 | 3/2025 | Guttridge et al. |
| 2025/0077188 A1 | 3/2025 | Guttridge et al. |
| 2025/0077189 A1 | 3/2025 | Guttridge et al. |
| 2025/0077190 A1 | 3/2025 | Guttridge et al. |
| 2025/0077204 A1 | 3/2025 | Guttridge et al. |
| 2025/0077227 A1 | 3/2025 | Guttridge et al. |
| 2025/0077396 A1 | 3/2025 | Sen |
| 2025/0077397 A1 | 3/2025 | Sen |
| 2025/0077399 A1 | 3/2025 | Sen |
| 2025/0077400 A1 | 3/2025 | Sen |
| 2025/0077556 A1 | 3/2025 | Guttridge et al. |
| 2025/0077681 A1 | 3/2025 | Sen |
| 2025/0077682 A1 | 3/2025 | Guttridge et al. |
| 2025/0077939 A1 | 3/2025 | Tabatabaei et al. |
| 2025/0078324 A1 | 3/2025 | Gormley |
| 2025/0078325 A1 | 3/2025 | Gormley |
| 2025/0078344 A1 | 3/2025 | Gormley |
| 2025/0078345 A1 | 3/2025 | Gormley |
| 2025/0078972 A1 | 3/2025 | Gormley |
| 2025/0085936 A1 | 3/2025 | Guttridge et al. |
| 2025/0086096 A1 | 3/2025 | Guttridge et al. |
| 2025/0086440 A1 | 3/2025 | Erb et al. |
| 2025/0086441 A1 | 3/2025 | Guttridge et al. |
| 2025/0086451 A1 | 3/2025 | Guttridge et al. |
| 2025/0086551 A1 | 3/2025 | Zhao |
| 2025/0094437 A1 | 3/2025 | Upendran |
| 2025/0103609 A1 | 3/2025 | Upendran |
| 2025/0103961 A1 | 3/2025 | Cresswell et al. |
| 2025/0103980 A1 | 3/2025 | Deljavan Farshi et al. |
| 2025/0104024 A1 | 3/2025 | Abbas |
| 2025/0104029 A1 | 3/2025 | Deljavan Farshi et al. |
| 2025/0104047 A1 | 3/2025 | Mashkevich |
| 2025/0104050 A1 | 3/2025 | Mashkevich |
| 2025/0104059 A1 | 3/2025 | Mashkevich |
| 2025/0104074 A1 | 3/2025 | Tsang et al. |
| 2025/0104306 A1 | 3/2025 | Mashkevich |
| 2025/0104700 A1 | 3/2025 | Henault-Ethier et al. |
| 2025/0106060 A1 | 3/2025 | Gormley et al. |
| 2025/0106201 A1 | 3/2025 | Gormley |
| 2025/0110805 A1 | 4/2025 | Starszyk et al. |
| 2025/0117411 A1 | 4/2025 | Mohammed |
| 2025/0117595 A1 | 4/2025 | Taheri |
| 2025/0117596 A1 | 4/2025 | Taheri |
| 2025/0117623 A1 | 4/2025 | Devarajan et al. |
| 2025/0117629 A1 | 4/2025 | Pandey et al. |
| 2025/0117630 A1 | 4/2025 | Taheri |
| 2025/0117769 A1 | 4/2025 | Taheri |
| 2025/0117836 A1 | 4/2025 | Taheri et al. |
| 2025/0117853 A1 | 4/2025 | Pandey et al. |
| 2025/0117854 A1 | 4/2025 | Pandey et al. |
| 2025/0117855 A1 | 4/2025 | Pandey et al. |
| 2025/0117856 A1 | 4/2025 | Pandey et al. |
| 2025/0119396 A1 | 4/2025 | Taheri |
| 2025/0119494 A1 | 4/2025 | Pandey et al. |
| 2025/0119495 A1 | 4/2025 | Pandey et al. |
| 2025/0124039 A1 | 4/2025 | Cashion et al. |
| 2025/0124240 A1 | 4/2025 | Luo et al. |
| 2025/0131718 A1 | 4/2025 | Ma et al. |
| 2025/0138838 A1 | 5/2025 | Ramesh et al. |
| 2025/0139267 A1 | 5/2025 | Zykh et al. |
| 2025/0139382 A1 | 5/2025 | Mohammed et al. |
| 2025/0139708 A1 | 5/2025 | Bouëttéet al. |
| 2025/0147733 A1 | 5/2025 | Abbas et al. |
| 2025/0148321 A1 | 5/2025 | Stanevich et al. |
| 2025/0165375 A1 | 5/2025 | Cresswell et al. |
| 2025/0165866 A1 | 5/2025 | Cresswell et al. |
| 2025/0173170 A1 | 5/2025 | Glynn-Udrow et al. |
| 2025/0173568 A1 | 5/2025 | Cresswell et al. |
| 2025/0173618 A1 | 5/2025 | Cresswell et al. |
| 2025/0173619 A1 | 5/2025 | Cresswell et al. |
| 2025/0173725 A1 | 5/2025 | Devarajan et al. |
| 2025/0181321 A1 | 6/2025 | Gormley |
| 2025/0182028 A1 | 6/2025 | Gormley |
| 2025/0182196 A1 | 6/2025 | Gormley |
| 2025/0182222 A1 | 6/2025 | Gormley |
| 2025/0191062 A1 | 6/2025 | Heglin et al. |
| 2025/0217175 A1 | 7/2025 | Karbasi et al. |
| 2025/0225560 A1 | 7/2025 | Bajaj et al. |
| 2025/0231668 A1 | 7/2025 | Tao et al. |
| 2025/0231750 A1 | 7/2025 | Lim et al. |
| 2025/0231774 A1 | 7/2025 | Tao et al. |
| 2025/0231775 A1 | 7/2025 | Tao et al. |
| 2025/0231793 A1 | 7/2025 | Lim et al. |
| 2025/0232130 A1 | 7/2025 | Tao et al. |
| 2025/0232351 A1 | 7/2025 | Tao et al. |
| 2025/0232375 A1 | 7/2025 | Tao et al. |
| 2025/0232376 A1 | 7/2025 | Tao et al. |
| 2025/0232377 A1 | 7/2025 | Tao et al. |
| 2025/0232503 A1 | 7/2025 | Lim et al. |
| 2025/0238536 A1 | 7/2025 | Nikoghossian et al. |
| 2025/0245071 A1 | 7/2025 | Ionescu et al. |
| 2025/0245511 A1 | 7/2025 | D'Agostino et al. |

* cited by examiner

Figure 5A:
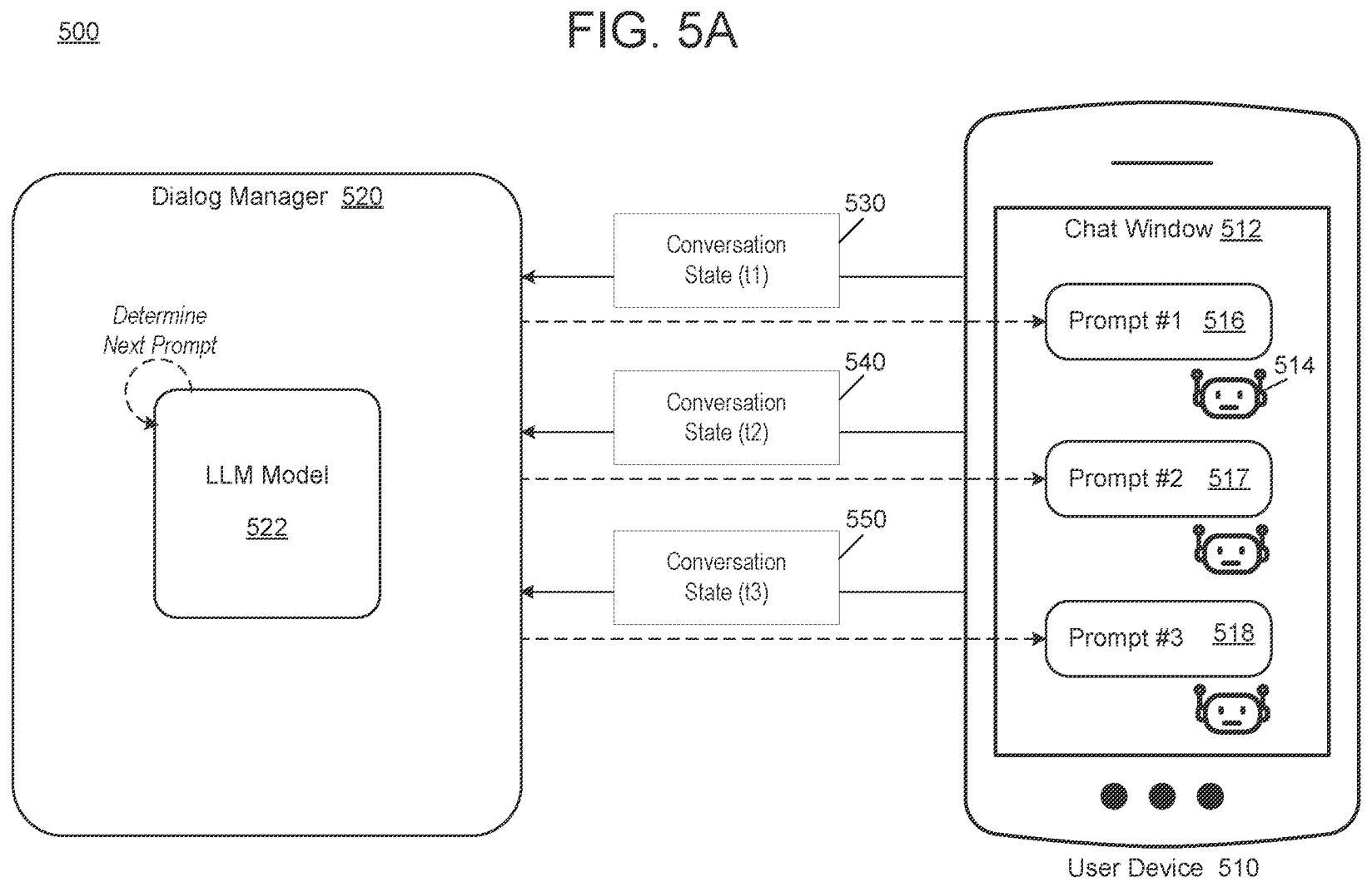

Chat Window 512

Prompt #1 516

514

Prompt #2 517

Prompt #3 518

User Device 510

Conversation State (t1) 530

Conversation State (t2) 540

Conversation State (t3) 550

Dialog Manager 520

Determine Next Prompt

LLM Model 522

FIG. 5B

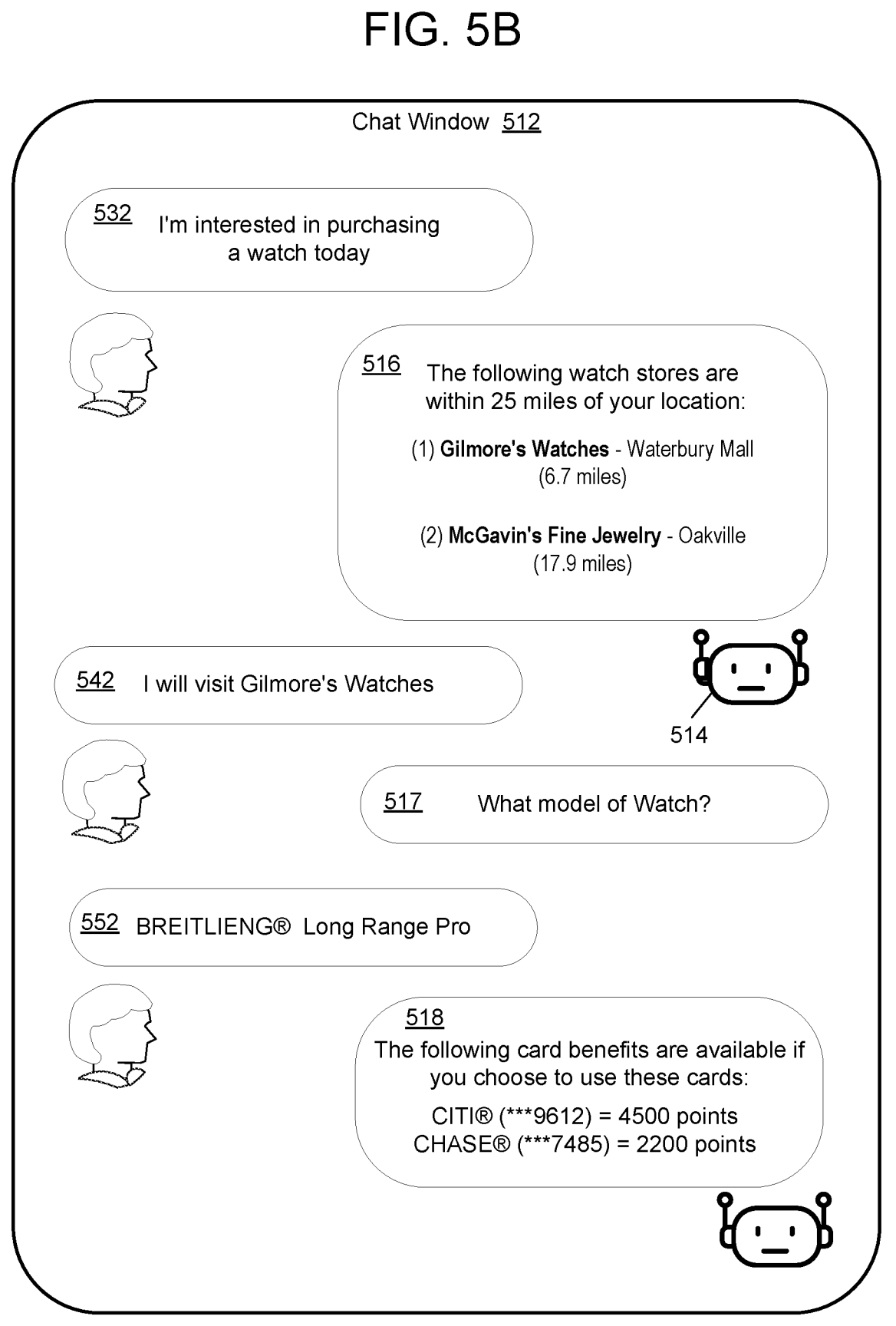

Chat Window  512

532  I'm interested in purchasing a watch today

516  The following watch stores are within 25 miles of your location:

(1) Gilmore's Watches - Waterbury Mall (6.7 miles)

(2) McGavin's Fine Jewelry - Oakville (17.9 miles)

514

542  I will visit Gilmore's Watches

517  What model of Watch?

552  BREITLIENG® Long Range Pro

518  The following card benefits are available if you choose to use these cards:

CITI® (***9612) = 4500 points
CHASE® (***7485) = 2200 points

FIG. 5C

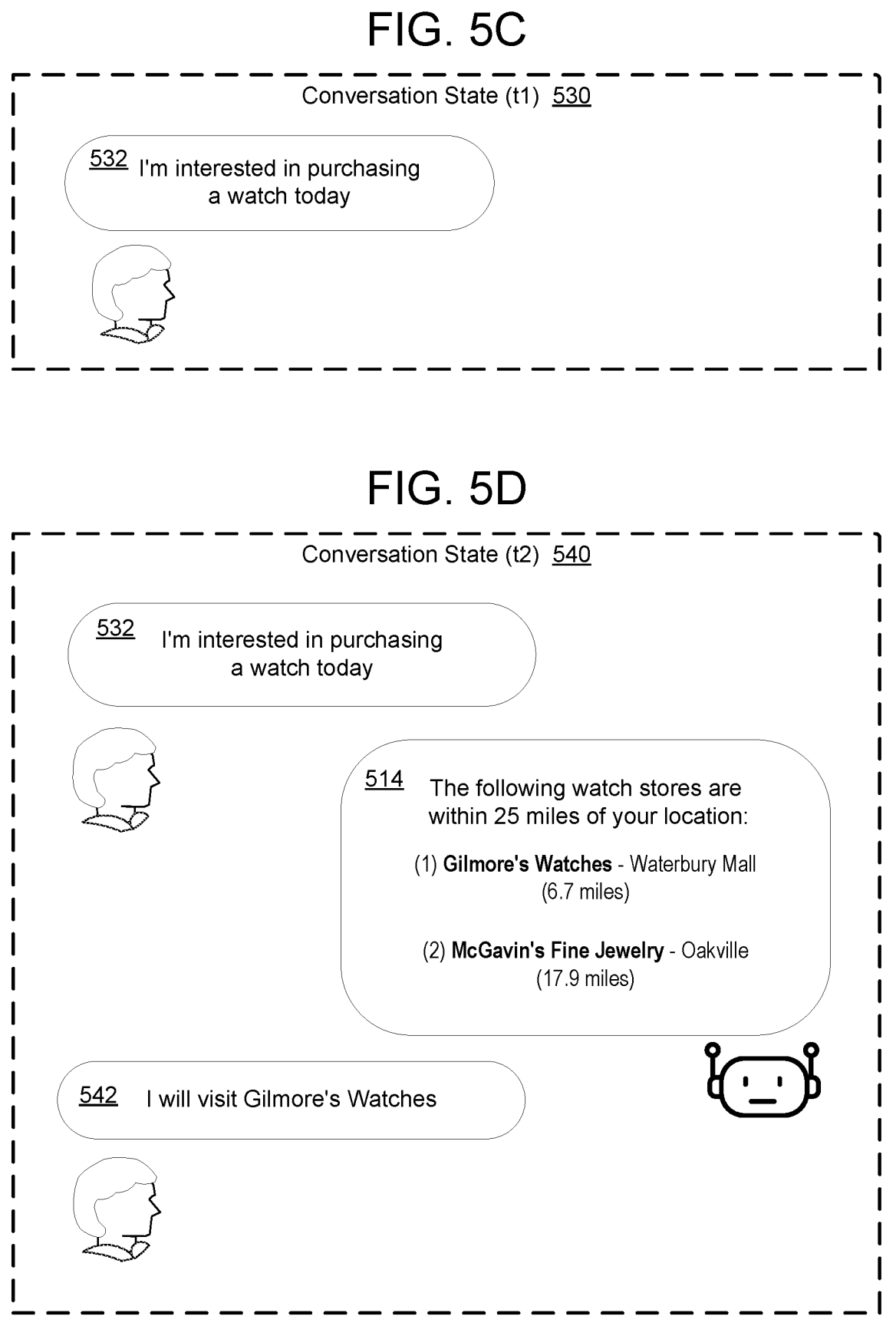

Conversation State (t1)  530

532  I'm interested in purchasing
a watch today

FIG. 5D

Conversation State (t2)  540

532  I'm interested in purchasing
a watch today

514  The following watch stores are
within 25 miles of your location:

(1) Gilmore's Watches - Waterbury Mall
(6.7 miles)

(2) McGavin's Fine Jewelry - Oakville
(17.9 miles)

542  I will visit Gilmore's Watches

Storing a Database of Payment Card Data

802

Conversing with a User via a Chatbot of a
Chat Window

803

Generating a Chatbot Response based on a Query
from the Chat and the Payment Card Data

804

Displaying the Chatbot Response

<u>810</u>            # FIG. 8B
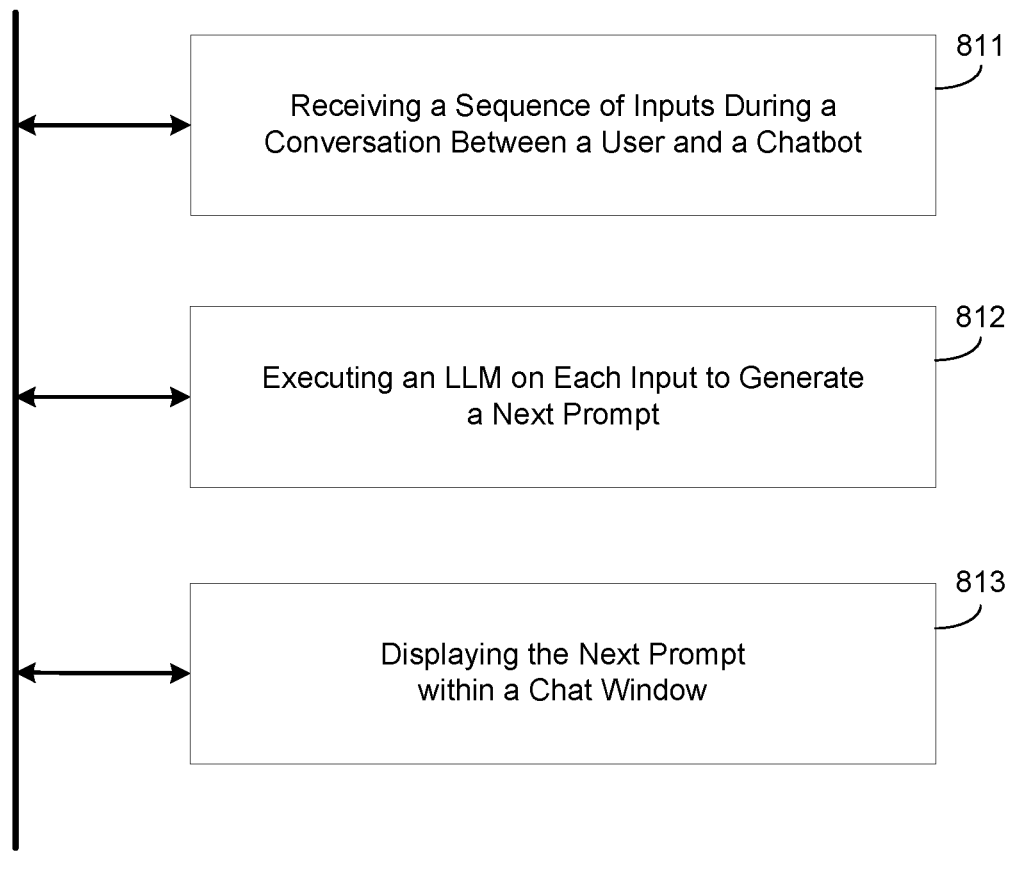
811
Receiving a Sequence of Inputs During a
Conversation Between a User and a Chatbot
812
Executing an LLM on Each Input to Generate
a Next Prompt
813
Displaying the Next Prompt
within a Chat Window <u>820</u>        FIG. 8C
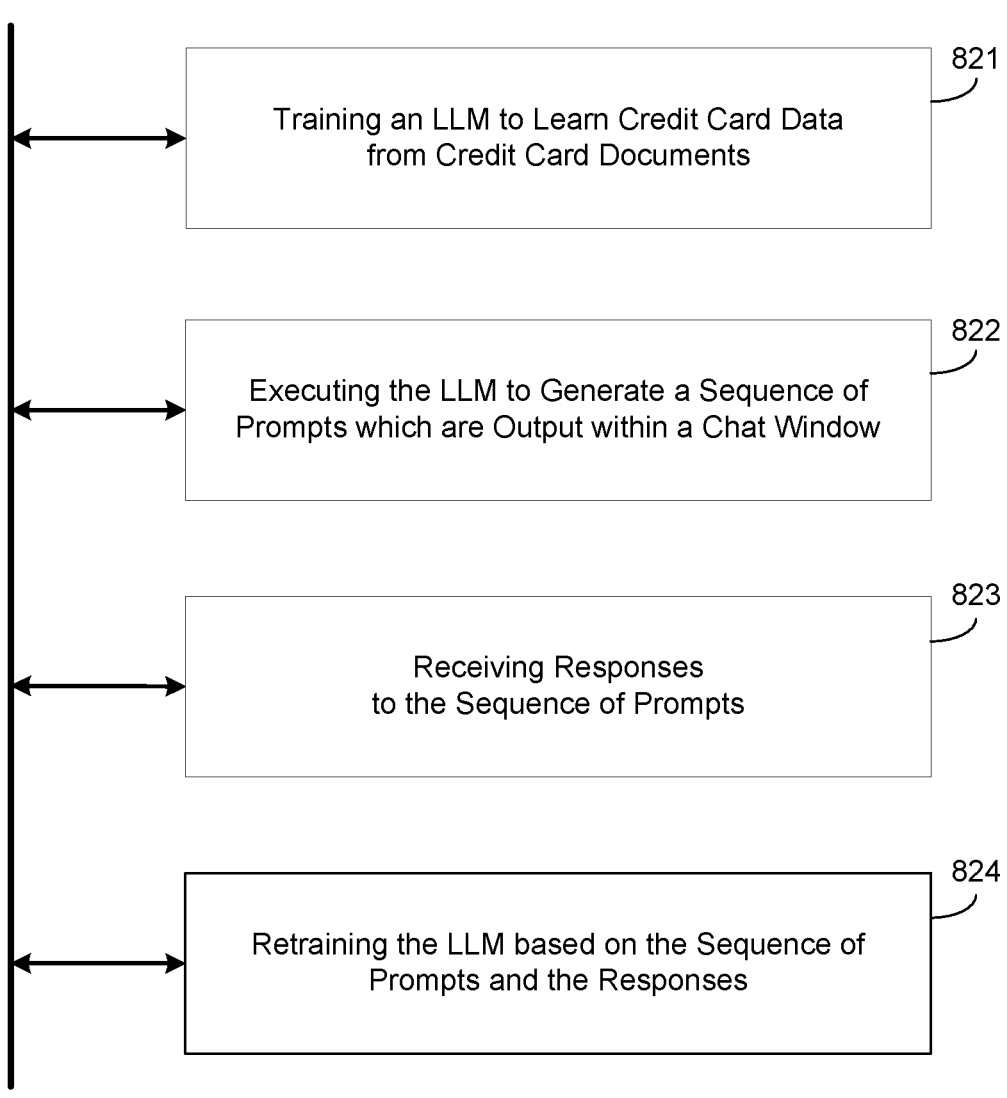
821
Training an LLM to Learn Credit Card Data
from Credit Card Documents
822
Executing the LLM to Generate a Sequence of
Prompts which are Output within a Chat Window
823
Receiving Responses
to the Sequence of Prompts
824
Retraining the LLM based on the Sequence of
Prompts and the Responses 830                                        FIG. 8D
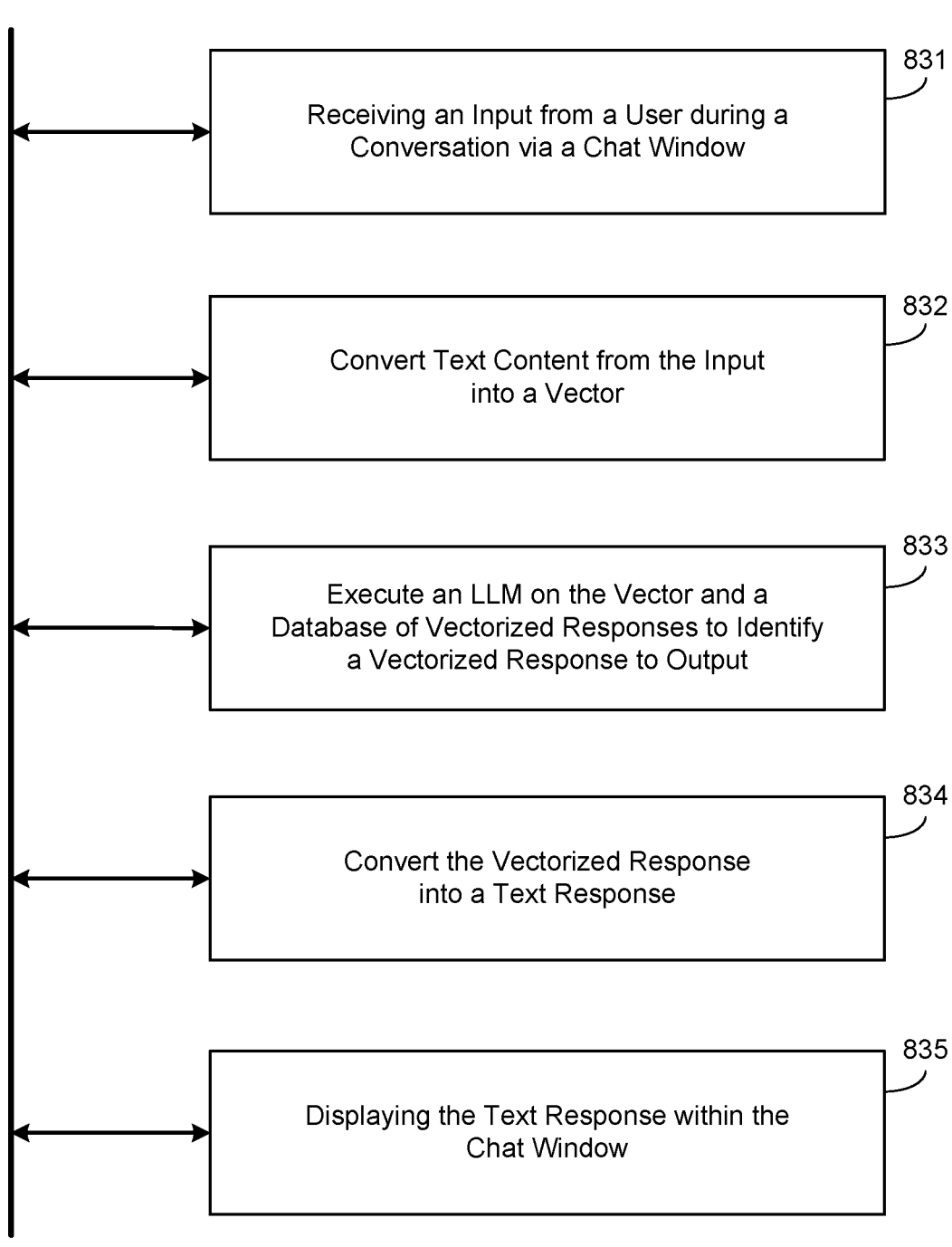
831
Receiving an Input from a User during a
Conversation via a Chat Window
832
Convert Text Content from the Input
into a Vector
833
Execute an LLM on the Vector and a
Database of Vectorized Responses to Identify
a Vectorized Response to Output
834
Convert the Vectorized Response
into a Text Response
835
Displaying the Text Response within the
Chat Window <u>840</u>                    FIG. 8E
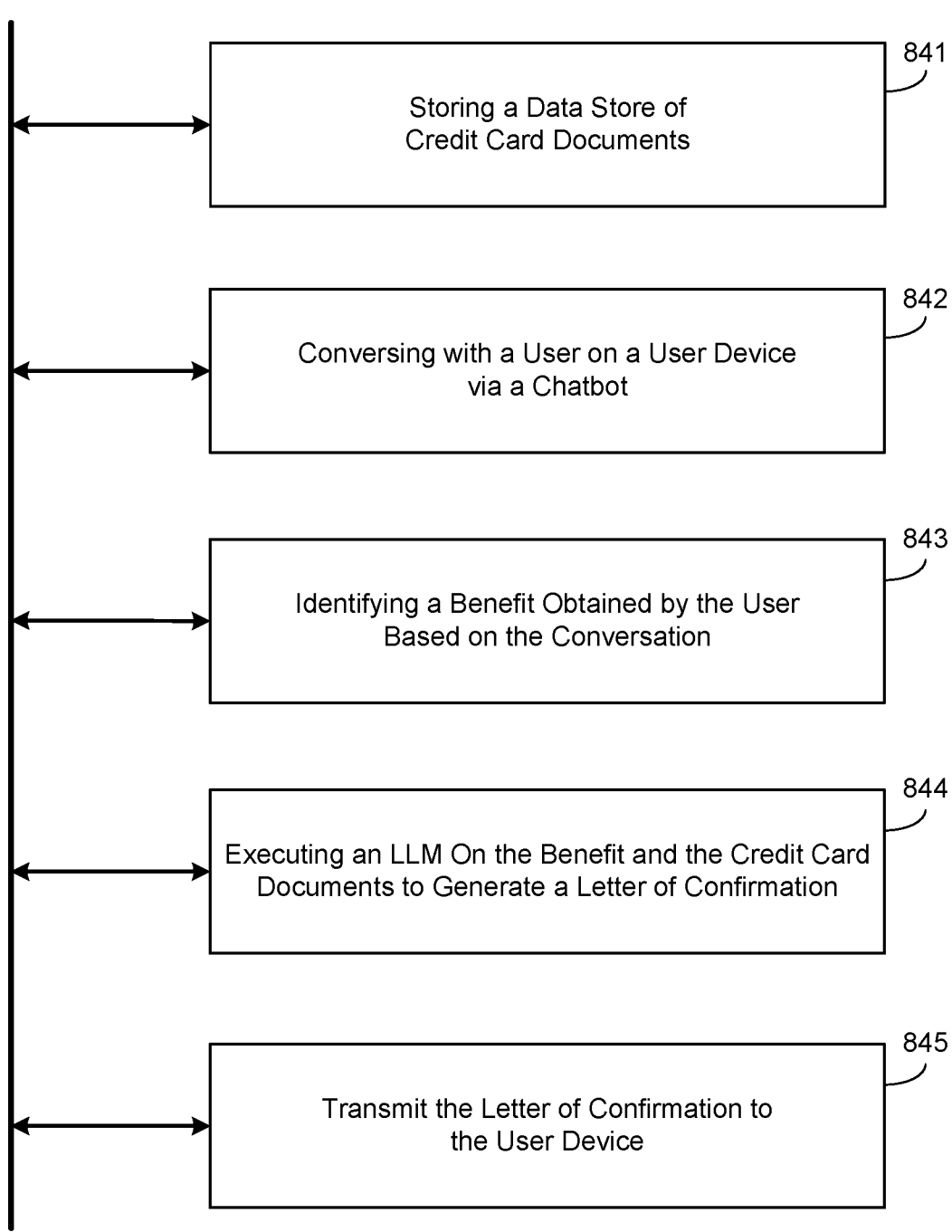
841
Storing a Data Store of
Credit Card Documents
842
Conversing with a User on a User Device
via a Chatbot
843
Identifying a Benefit Obtained by the User
Based on the Conversation
844
Executing an LLM On the Benefit and the Credit Card
Documents to Generate a Letter of Confirmation
845
Transmit the Letter of Confirmation to
the User Device 900        FIG. 9
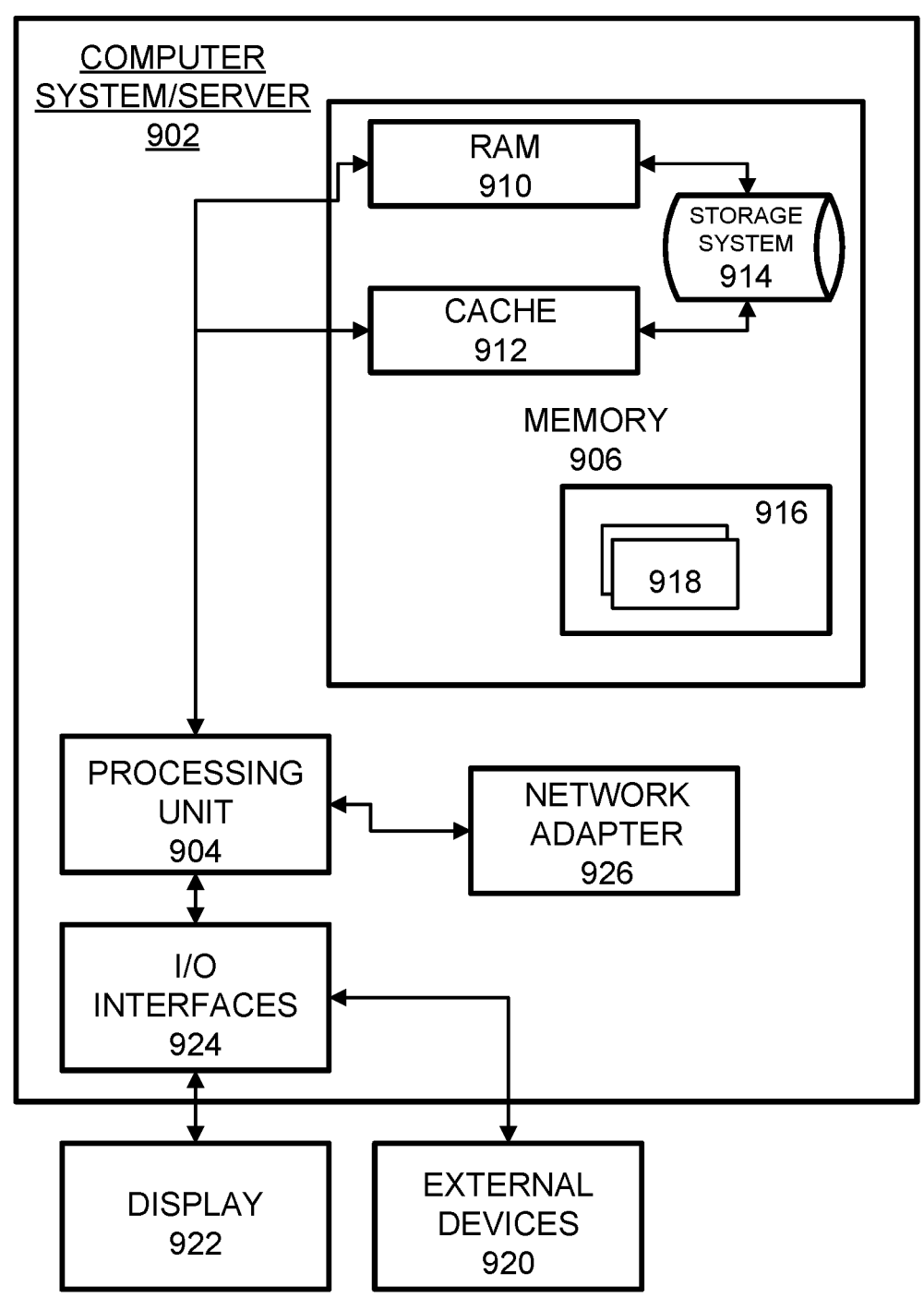

GENAI LETTER OF CONFIRMATION OF BENEFITS

BACKGROUND

Many consumers rely on payment cards such as credit cards, debit cards, gift cards, and other payment cards when making daily purchases. In many cases, the payment cards provide the cardholder with benefits such as travel insurance, cash back, points towards rewards, and the like. In some cases, a credit card company (or other financial institutions) may partner with a particular merchant resulting in benefits to both the merchant and the cardholders of the credit card companies. However, rarely does a cardholder understand all of the benefits that are available to them through the different payment cards in their wallet, nor which merchants provide benefits that are specific to one card over another card.

SUMMARY

One example embodiment provides an apparatus that may include a memory and a processor coupled to the memory, the processor configured to one or more of store a data store of credit card documentation, converse with a user via a chatbot within a chat window of a software application, wherein the conversation comprises a reception of natural language inputs with requests for information about a payment card, identify a benefit obtained by the user based on the conversation, execute a large language model (LLM) on the identified benefit and the data store of the credit card documentation to generate a letter of confirmation, and generate an electronic message with the letter of confirmation attached, and transmit the electronic message to a user device.

Another example embodiment provides a method that includes one or more of storing a data store of credit card documentation, conversing with a user via a chatbot within a chat window of a software application, wherein the conversing comprises receiving natural language inputs with requests for information about a payment card, identifying a benefit obtained by the user based on the conversation, executing a large language model (LLM) on the identified benefit and the data store of the credit card documentation to generate a letter of confirmation and generating an electronic message with the letter of confirmation attached, and transmitting the electronic message to a user device.

A further example embodiment provides a computer-readable medium comprising instructions, that when read by a processor, cause the processor to perform one or more of storing a data store of credit card documentation, conversing with a user via a chatbot within a chat window of a software application, wherein the conversing comprises receiving natural language inputs with requests for information about a payment card, identifying a benefit obtained by the user based on the conversation, executing a large language model (LLM) on the identified benefit and the data store of the credit card documentation to generate a letter of confirmation and generating an electronic message with the letter of confirmation attached, and transmitting the electronic message to a user device.

A further example embodiment provides an apparatus that may include a memory and a processor coupled to the memory, the processor configured to one or more of receive an input from a user during a conversation that includes a plurality of prompts between the user and a chatbot within a chat window of a software application, convert text content within the received input into a vector, execute a large language model (LLM) on the vector and a database of vectorized responses to identify a vectorized response to output from among the plurality of vectorized responses within the database, convert the vectorized response into a text response, and display the text response output by the chatbot within the chat window of the software application.

A further example embodiment provides a method that includes one or more of receiving an input from a user during a conversation that includes a plurality of prompts between the user and a chatbot within a chat window of a software application, converting text content within the received input into a vector, executing a large language model (LLM) on the vector and a database of vectorized responses to identify a vectorized response to output from among the plurality of vectorized responses within the database, converting the vectorized response into a text response, and displaying the text response output by the chatbot within the chat window of the software application.

A further example embodiment provides a computer-readable medium comprising instructions, that when read by a processor, cause the processor to perform one or more of receiving an input from a user during a conversation that includes a plurality of prompts between the user and a chatbot within a chat window of a software application, converting text content within the received input into a vector, executing a large language model (LLM) on the vector and a database of vectorized responses to identify a vectorized response to output from among the plurality of vectorized responses within the database, converting the vectorized response into a text response, and displaying the text response output by the chatbot within the chat window of the software application.

A further example embodiment provides an apparatus that may include a memory, and a processor coupled to the memory, the processor configured to one or more of train a large language model (LLM) to learn credit card data via execution of the LLM on content from one or more credit card documents, execute the LLM to generate a sequence of prompts which are output via a chatbot within a chat window of a software application, receive responses to the sequence of prompts from a user via the chat window of the software application, and retrain the LLM model to further learn credit card data via execution of the LLM on a combination of the sequence of prompts and the received responses to the sequence of prompts.

A further example embodiment provides a method that includes one or more of training a large language model (LLM) to learn credit card data via execution of the LLM on content from one or more credit card documents, executing the LLM to generate a sequence of prompts which are output to a user via a chatbot within a chat window of a software application, receiving responses to the sequence of prompts for the user via the chat window of the software application, and retraining the LLM model to further learn credit card data via execution of the LLM on a combination of the sequence of prompts and the received responses.

A further example embodiment provides a computer-readable medium comprising instructions, that when read by a processor, cause the processor to perform one or more of training a large language model (LLM) to learn credit card data via execution of the LLM on content from one or more credit card documents, executing the LLM to generate a sequence of prompts which are output to a user via a chatbot within a chat window of a software application, receiving responses to the sequence of prompts for the user via the chat window of the software application, and retraining the LLM model to further learn credit card data via execution of the LLM on a combination of the sequence of prompts and the received responses.

A further example embodiment provides an apparatus that may include a memory, and a processor coupled to the memory, the processor configured to one or more of receive a sequence of inputs from a user when in a conversation with a chatbot within a chat window of a software application, execute a large language model (LLM) on each input from the user to determine a next prompt to output via the chatbot, respectively, wherein each execution of the LLM includes a new chat input from the user and a most-recent state of the conversation between the user and the chatbot within the chat window, and display the next prompt output by the chatbot within the chat window on a user device.

A further example embodiment provides a method that includes one or more of receiving a sequence of inputs from a user during a conversation between the user and a chatbot within a chat window of a software application, executing a large language model (LLM) on each input from the user to determine a next prompt to output via the chatbot, respectively, wherein each execution of the LLM includes a new chat input from the user and a most-recent state of the conversation between the user and the chatbot within the chat window, and displaying the next prompt within a chat window on a user device.

A further example embodiment provides a computer-readable medium comprising instructions, that when read by a processor, cause the processor to perform one or more of receiving a sequence of inputs from a user during a conversation between the user and a chatbot within a chat window of a software application, executing a large language model (LLM) on each input from the user to determine a next prompt to output via the chatbot, respectively, wherein each execution of the LLM includes a new chat input from the user and a most-recent state of the conversation between the user and the chatbot within the chat window, and displaying the next prompt within a chat window on a user device.

A further example embodiment provides an apparatus that may include a memory, and a processor coupled to the memory, the processor configured to one or more of store a database of payment card data, converse with a user via a chatbot within a chat window of a software application, wherein the conversation comprises a reception of a query from the user about a payment card in a chat session between the user and the chatbot, execute a large language model (LLM) on the query about the payment card and the database of payment card data to generate a chatbot response, and display the generated chatbot response via the chatbot within the chat window of the software application in the chat session.

A further example embodiment provides a method that includes one or more of storing a database of payment card data, conversing with a user via a chatbot within a chat window of a software application, wherein the conversing comprises receiving a query from the user about a payment card during a chat session between the user and the chatbot, executing a large language model (LLM) on the query about the payment card and the database of payment card data to generate a chatbot response, and displaying the generated chatbot response via the chatbot within the chat window of the software application during the chat session.

A further example embodiment provides a computer-readable medium comprising instructions, that when read by a processor, cause the processor to perform one or more of storing a database of payment card data, conversing with a user via a chatbot within a chat window of a software application, wherein the conversing comprises receiving a query from the user about a payment card during a chat session between the user and the chatbot, executing a large language model (LLM) on the query about the payment card and the database of payment card data to generate a chatbot response, and displaying the generated chatbot response via the chatbot within the chat window of the software application during the chat session.

BRIEF DESCRIPTION OF THE DRAWINGS

FIGS. 3A-3C are diagrams illustrating processes for training a machine learning model according to example embodiments.

FIGS. 5A-5E are diagrams illustrating a process of generating chat content based on a dynamic conversation state according to example embodiments.

FIGS. 7A-7B are diagrams illustrating a process of generating and sending a letter of confirmation to a user device according to example embodiments.

FIG. 8B is a diagram illustrating a method of executing a large language model for a chatbot based on a dynamic conversation state according to example embodiments.

FIG. 8C is a diagram illustrating a method of training an LLM for a chatbot according to example embodiments.

FIG. 8D is a diagram illustrating a method of a chatbot generating responses using a database of vectorized responses according to example embodiments.

FIG. 8E is a diagram illustrating a method of generating a letter of recommendation of benefits according to example embodiments.

FIG. 9 is a diagram illustrating a computing system that may be used in any of the example embodiments described herein.

DETAILED DESCRIPTION

Figure 1:
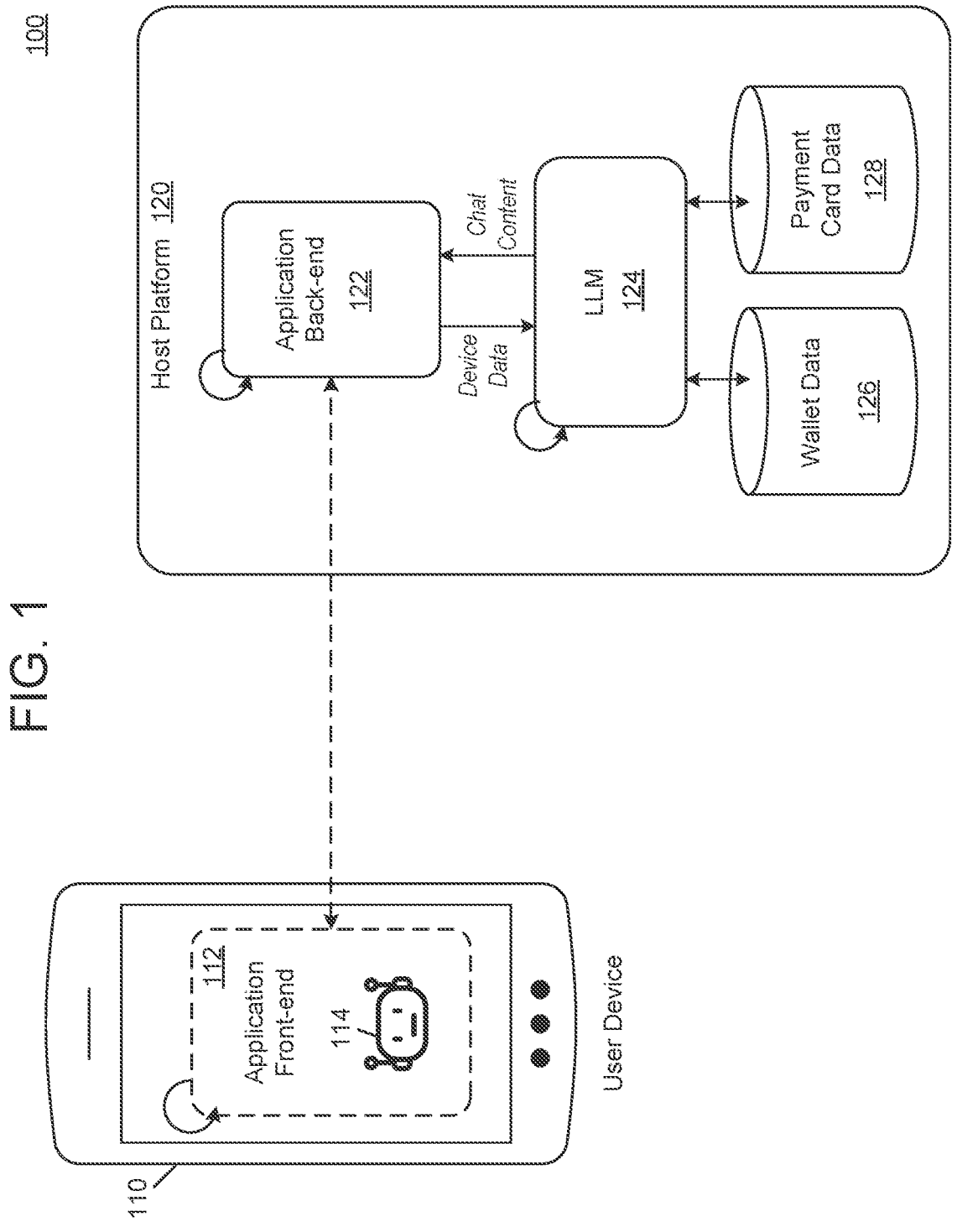
FIG. 1 is a diagram illustrating a computing environment for a chatbot that discusses payment card data according to example embodiments.

It is to be understood that although this disclosure includes a detailed description of cloud computing, implementation of the teachings recited herein is not limited to a cloud computing environment. Rather, embodiments of the instant solution can be implemented in conjunction with any other type of computing environment now known or later developed. Although described in a particular manner, by example only, or more feature(s), element(s), and step(s) described herein may be utilized together, and in various combinations, without exclusively, unless expressly indicated otherwise herein.

The example embodiments are directed to a platform that hosts a chatbot configured to converse with users about payment cards, including payment cards stored in their digital wallet. The chatbot may be embodied within a mobile application, such as a mobile payment application, digital wallet, etc. The chatbot may be based on an artificial intelligence system that uses a large language model (LLM) to learn a correlation between benefits offered by payment cards and products available for purchase.

The LLM can ingest payment card documentation, manuals, standards, user guides, frequently asked questions (FAQs) pages, and the like. The LLM can also ingest content from various products and learn mappings between content (e.g., a description of benefits, etc.) in the credit card documentation and a merchant's product.

For example, a user may open the chatbot on their device by opening their mobile wallet, including a chat window. Here, the user may input questions/queries the chat will answer. For example, the user may ask the chatbot questions about a product of interest. The chatbot may describe the benefits the user will obtain if they purchase the product using their payment cards. In some embodiments, the LLM may match a query about a product to a piece of content within a document stored in a database, extract the content from the document, and display the content on the chat window.

As another example, the LLM may receive a query from a user and determine to respond with a letter of recommendation rather than a chat response. Here, the LLM may identify a portion of a payment card document that reads along a particular question from the user and generate a letter of recommendation with content from the piece of content. The letter of recommendation may also include additional text content generated through generative AI.

According to various embodiments, the LLM may be a generative artificial intelligence (GenAI) model, such as a multimodal large language model. The LLM can understand connections between products and payment card benefits written within payment card documents. For example, the LLM may include libraries and deep learning frameworks that enable the LLM model to create content from the credit card documentation based on text inputs.

In some embodiments, the system described herein may use a vector database that stores vectorized responses that the chatbot can use to respond to queries from a user. For example, the vector database may store a plurality of responses that can be output by the chatbot in vector form. The user may submit a query to the chatbot via a chat window. The query may be converted into vector form and then compared to the vector database by the LLM to identify the vectorized response within the vector database that most closely matches the location of the vector within vector space.

FIG. 1 illustrates a computing environment 100 for a chatbot 114 that discusses payment card data according to example embodiments. Referring to FIG. 1, a host platform 120, such as a cloud platform, web server, etc., may host a mobile application (e.g., a back end 122) that includes a large language model (LLM) 124 and a data store 126 with wallet data and a data store 128 with credit card documentation. A user may use a user device 110 to download and install the mobile application (e.g., a front-end 112). For example, the user device 110 may download the mobile application from an application marketplace and install the application using an operating system of the user device 110.

Here, the host platform 120 may host the software application and make it accessible to the user device 110 over a computer network such as the Internet.

In the example embodiments, the LLM 124 may receive conversation content from a chat conversation between the user and the chatbot 114. For example, text content from a chat window of the chatbot 114 may be extracted and submitted to the LLM 124 by the back end 122. The text content may identify which entity said which comment (e.g., the user or the chatbot, etc.). The text content may also be ordered based on the order in which it is posted to the chat window, thereby enabling the sequence to be used by the LLM 124. As another example, the LLM 124 may receive contextual data from the user device 110, such as global positioning system (GPS) coordinates of the current location of the user device 110, thus providing the user's current location. As another example, the LLM 124 may receive product information such as a serial number, stock-keeping unit (SKU) number, or the like.

The LLM may use the input data to converse with the user about credit card documents stored in the data store 128, which are related to the user's payment cards, which can be identified from wallet data stored in the data store 126. For example, one or more of text content from a chat window, contextual content from the user device 110, payment card data from the data store 128, and the like may be input to the LLM 124 when generating responses to be output by the chatbot 114 displayed on the user device 110.

As an example, a user may open the mobile application on the user device 110 while standing in line to checkout at a merchant location. Here, the user may enter a query into a chat window of the mobile application, which includes the chatbot 114. The query may identify a product the user is about to purchase. In response, the LLM 124 may ingest the query and identify which cards are currently held in a mobile wallet on the user device (e.g., within mobile application 112) from the data store 126 and identify the benefits that are associated with each based on the payment card documents stored in the data store 128. The resulting benefits may be displayed within the chat window on the user device 110. As an example, the benefits may be output by the chatbot within the chat window.

Figure 2:
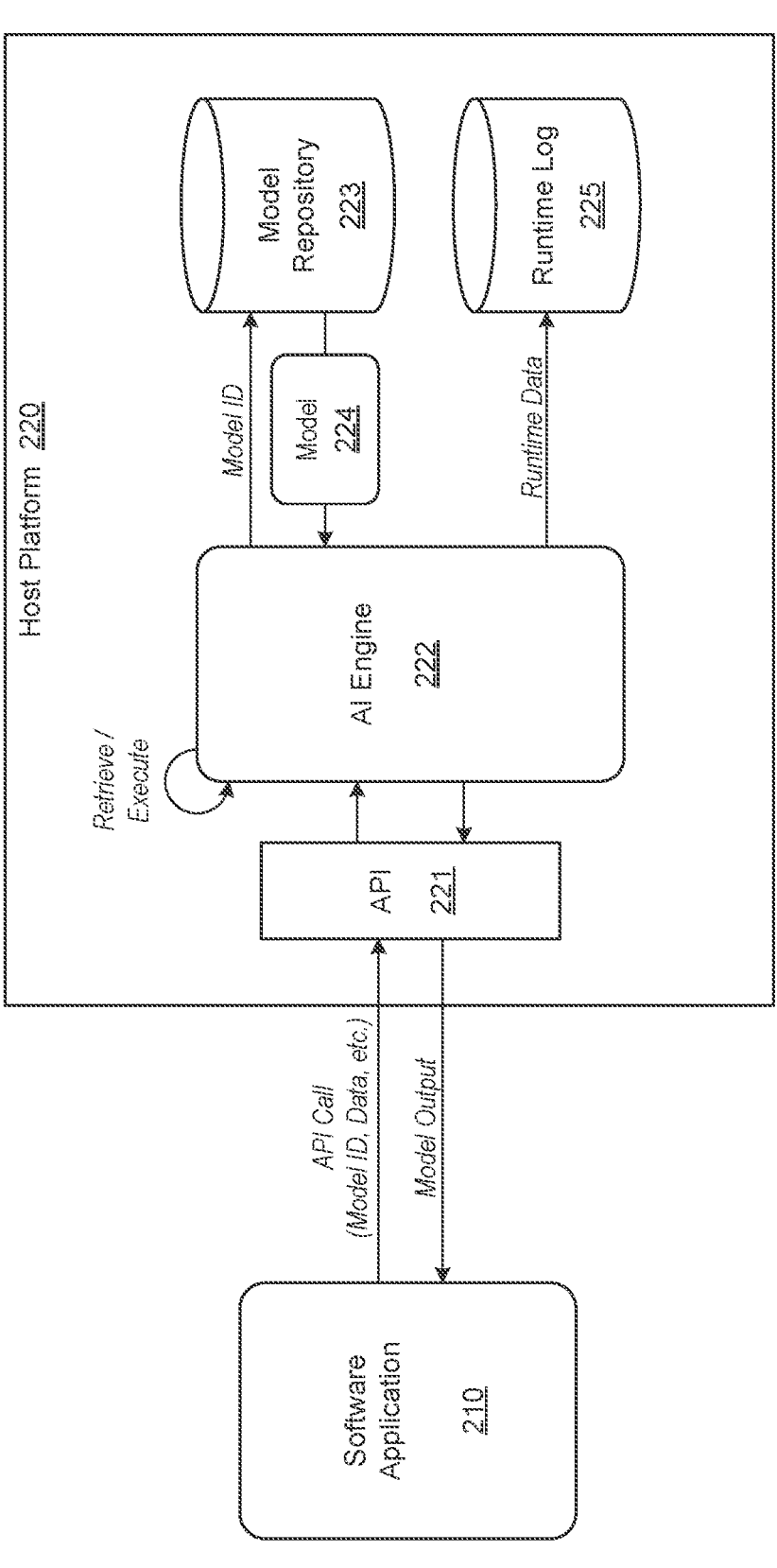
FIG. 2 is a diagram illustrating a process of executing a machine-learning model on input content according to example embodiments.

FIG. 2 illustrates a process 200 of executing a model 224 on input content according to example embodiments. As an example, the model 224 may be the LLM 124 described with respect to FIG. 1; however, embodiments are not limited thereto. Referring to FIG. 2, a software application 210 may request execution of the model 224 by submitting a request to the host platform 220. In response, an AI engine 222 may receive the request and trigger the model 224 to execute within a runtime environment of the host platform 220.

In FIG. 2, the AI engine 222 may control access to models stored within the model repository 223. For example, the models may include GenAI models, AI models, machine learning models, LLMs, neural networks, and/or the like. The software application 210 may trigger execution of the model 224 from the model repository 223 via submission of a call to an API 221 (application programming interface) of the AI engine 222. The request may include an identifier of the model 224, such as a unique ID assigned by the host platform 220, a payload of data (e.g., to be input to the model during execution), and the like. The AI engine 222 may retrieve the model 224 from the model repository 223 in response and deploy the model 224 within a live runtime environment. After the model is deployed, the AI engine 222 may execute the running instance of the model 224 on the payload of data and return a result of the execution to the software application 210.

In some embodiments, the payload of data may be a format that cannot be input to the model 224 nor read by a computer processor. For example, the data payload may be in text format, image format, audio format, and the like. In response, the AI engine 222 may convert the data payload into a format readable by the model 224, such as a vector or other encoding. The vector may then be input to the model 224.

In some embodiments, the software application 210 may display a user interface that enables a user thereof to provide feedback from the output provided by the model 224. For example, a user may input an identifier of a product of interest, and the product may output credit card benefits associated with the product of interest.

Here, the user may provide feedback indicating whether the output benefits are correct or not. According to various embodiments the feedback may be submitted through a chat window with a chatbot according to various embodiments. This information may be added to the results of execution and stored within a log 225.

The log 225 may include an identifier of the input, an identifier of the output, an identifier of the model used, and feedback from the recipient. This information may be used to subsequently retrain the model.

Figure 3A:
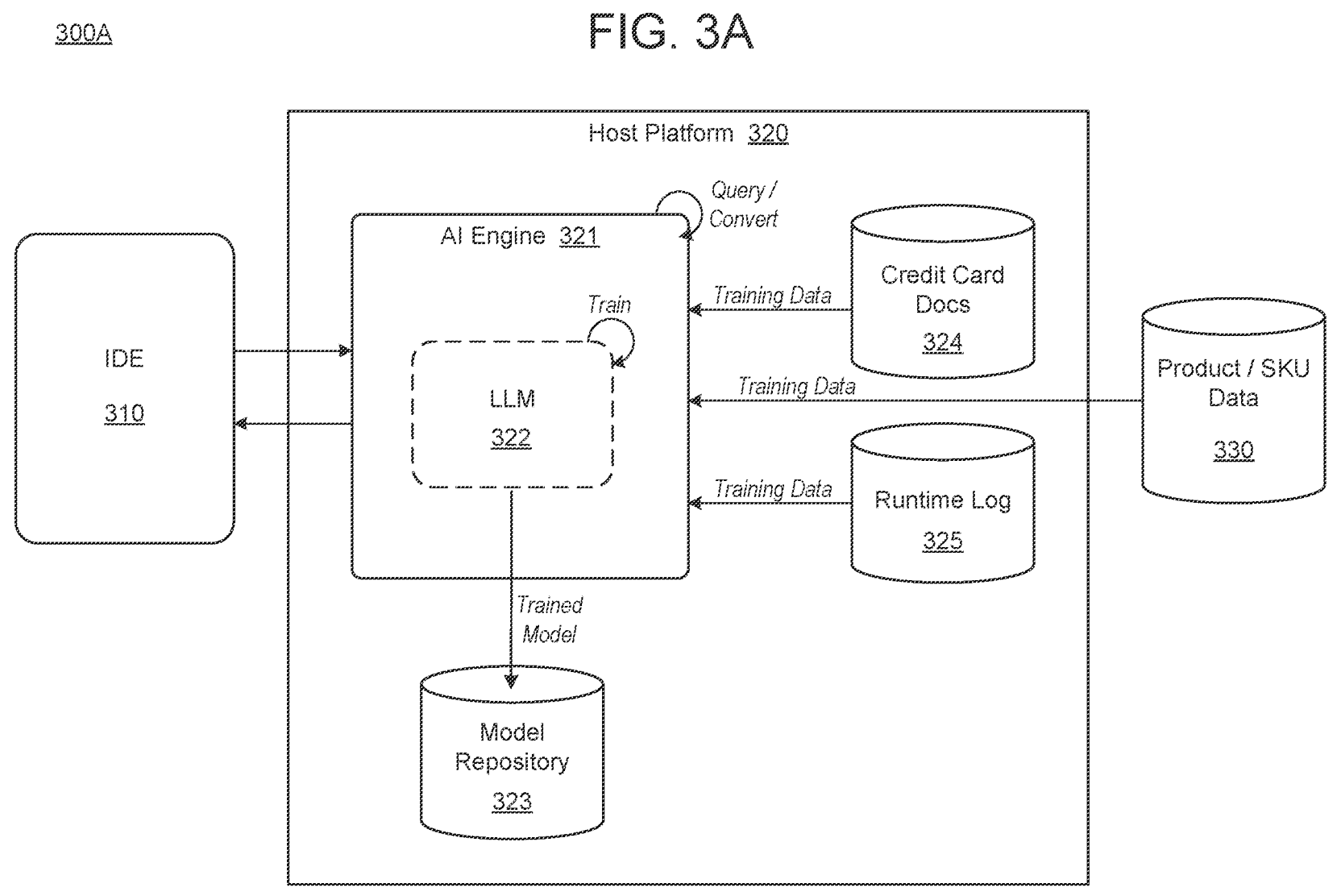

FIG. 3A illustrates a process 300A of training an LLM 322 according to example embodiments. However, it should be appreciated that the process 300A shown in FIG. 3A also applies to other models, such as machine learning models, GenAI models, AI models, and the like. Referring to FIG. 3A, a host platform 320 may host an IDE 310 (integrated development environment) where LLM models, machine learning models, AI models, and the like may be developed, trained, retrained, and the like. In this example, the IDE 310 may include a software application with a user interface accessible by a user device over a network or through a local connection.

For example, the IDE 310 may be embodied as a web application that can be accessed at a network address, URL, etc., by a device. As another example, the IDE 310 may be locally or remotely installed on a computing device used by a user.

The IDE 310 may be used to design a model (via a user interface of the IDE), such as a large language model (e.g., the LLM 322, etc.) that can receive text as input and generate custom imagery, text, etc. which can be displayed on a user interface/dashboard of a software application that displays content during meetings between user devices. The LLM 322 can be executed/trained based on the training data established via the user interface. For example, the user interface may be used to build a new model. The training data for training such a new model may be provided from a training data store such as a database 327, which includes training samples from the web, credit card documents, mappings between product identifiers and credit card benefits, runtime feedback, and the like. As another example, the training data may be pulled from one or more external data stores 330 such as publicly available sites, etc.

The LLM 322 may be executed on training data via an AI engine 321 of the host platform 320 during training. The training data may be queried from the different data stores, vectorized if necessary, and executed by the LLM 322. The LLM 322 may learn mappings/connections between credit card benefits and product identifiers, product types, and the like, during the execution and can learn to converse with the user based on the content consumed. When fully trained, the model may be stored within the model repository 323 via the IDE 310, or the like.

As another example, the IDE 310 may retrain the LLM 322 after the model has already been deployed. Here, the training process may use executional results that have already been generated/output by the LLM 322 in a live environment (including any customer feedback, etc.) to retrain the LLM 322. For example, predicted benefits of a payment card generated by the LLM 322 and the user feedback about the predicted benefits (e.g., whether they were correct or not) may be used to retrain the model to further enhance the images generated for all users. The responses may indicate whether the generated content is correct and, if not, what aspects of the images and text are incorrect. This data may be captured and stored within a runtime log 325 or other data store within the live environment and can be subsequently used to retrain the LLM 322.

In one embodiment, the current solution may begin by training an LLM 322 on credit card documents 324. Once trained, the LLM produces a sequence of prompts. These prompts are showcased to the user via a chatbot. The user's responses are then used in conjunction with the prompts to further refine the LLM's understanding of credit card data. The order in which users respond to sequences of prompts is valuable. The current solution utilizes this order to inform the retraining process, ensuring the LLM understands sequences of user interest or inquiry. Recognizing the relationship between specific products (e.g., card types) and their associated benefits is crucial. The LLM is trained to deduce these connections based on conversational prompts and responses. The current solution tracks the conversation's history, combining both user and chatbot interactions. This history guides the LLM to generate more contextually relevant prompts.

In one embodiment, the LLM 322 isn't limited to a test environment. The current solution deploys it in real-time platforms, logging the model's runtime data-essentially, how it's behaving and deciding in live interactions. The current solution utilizes this logged data to further refine the LLM's training. When a user's response indicates a specific focus area or topic, the current solution extracts relevant data from stored credit card documents 324 and displays it directly in the chat.

After presenting specific content, the LLM, using its deep understanding, can determine the next best prompt to keep the conversation flowing.

Figure 3B:
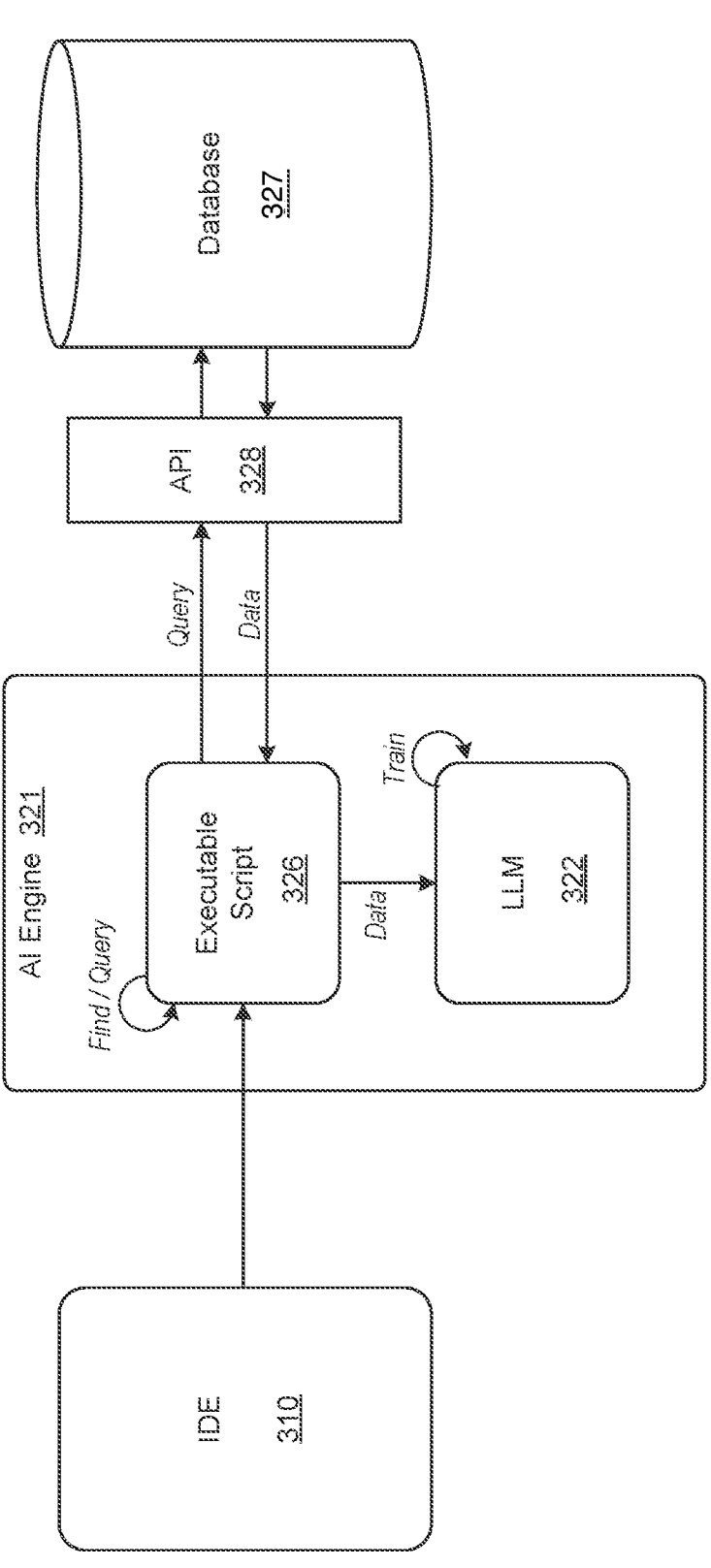

FIG. 3B illustrates a process 300B of executing a training process for training/retraining the LLM 322 via an AI engine 321. In this example, a script 326 (executable) is developed and configured to read data from a database 327 and input the data to the LLM 322 while the LLM is running/executing via the AI engine 321. For example, the script 326 may use identifiers of data locations (e.g., table IDs, row IDs, column IDs, topic IDs, object IDs, etc.) to identify locations of the training data within the database 327 and query an API 328 of the database 327. In response, the database 327 may receive the query, load the requested data, and return it to the AI engine 321, which is input to the LLM 322. The process may be managed via a user interface of the IDE 310, which enables a human-in-the-loop during the training process (supervised learning). However, it should also be appreciated that the system is capable of unsupervised learning as well.

The script 326 may iteratively retrieve additional training data sets from the database 327 and iteratively input the additional training data sets into the LLM 322 during the execution of the model to continue to train the model.

The script may continue until instructions within the script tell the script to terminate, which may be based on a number of iterations (training loops), total time elapsed during the training process, etc.

Figure 3C:
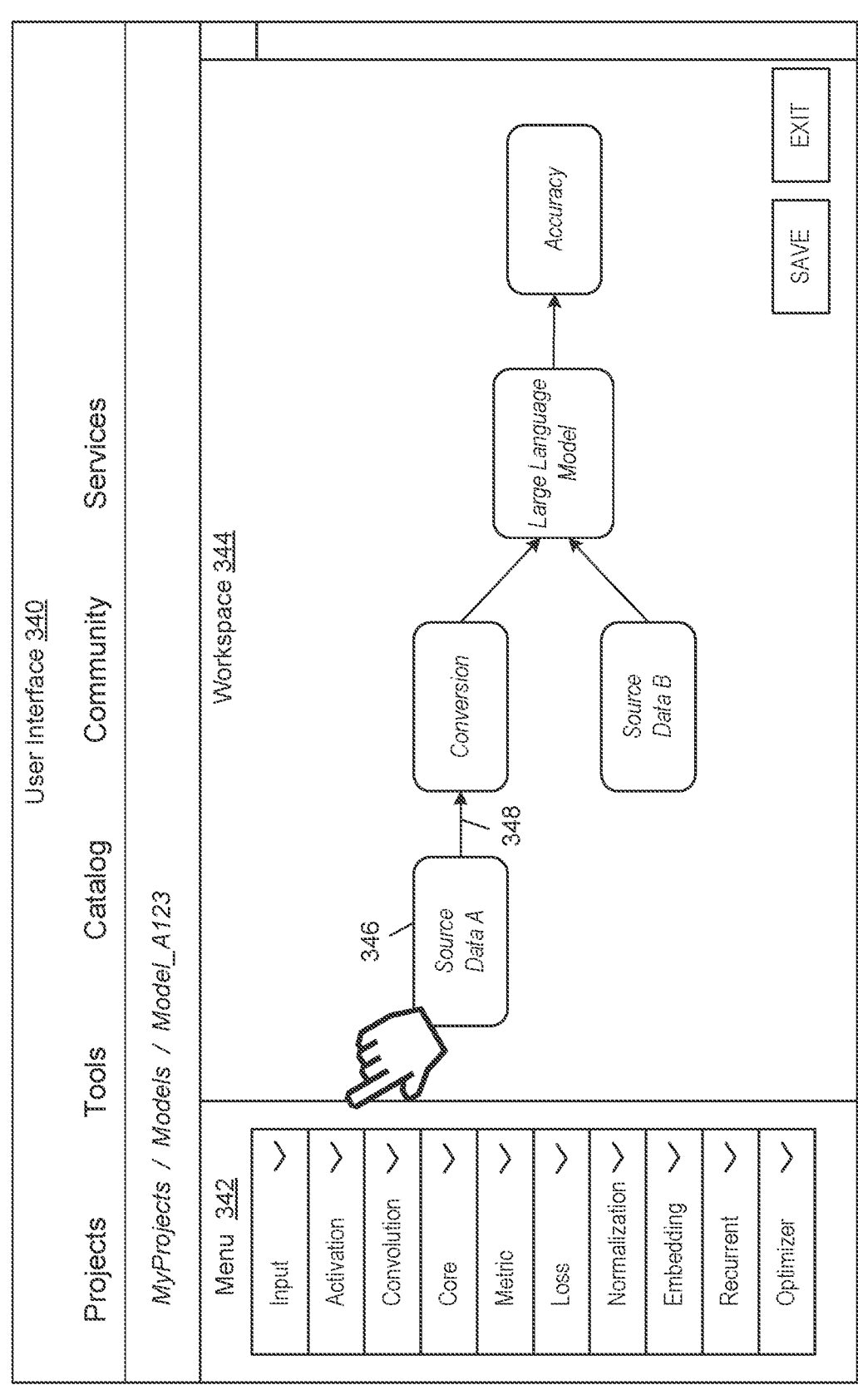

FIG. 3C illustrates a process 300C of designing a new AI model via a user interface 340 according to example embodiments. As an example, the user interface 340 may be output as part of the software application which interacts with the IDE 310 shown in FIG. 3A, however, embodiments are not limited thereto. Referring to FIG. 3C, a user can use an input mechanism to make selections from a menu 342 shown on the left-hand side of the user interface 340 to add pieces to the model such as data components, model components, analysis components, etc., within a workspace 344 of the user interface 340.

In the example of FIG. 3C, the menu 342 includes a plurality of graphical user interface (GUI) menu options, which can be selected to drill down into additional components that can be added to the model design shown in the workspace 344.

Here, the GUI menu options include options for adding features such as neural networks, machine learning models, AI models, data sources, conversion processes (e.g., vectorization, encoding, etc.), analytics, etc. The user can continue to add features to the model and connect them using edges or other means to create a flow within the workspace 344. For example, the user may add a node 346 to a new model diagram within the workspace 344. For example, the user may connect the node 346 to another node in the diagram via an edge 348, creating a dependency within the diagram. When the user is done, the user can save the model for subsequent training/testing.

According to various embodiments, the LLM described herein may be trained based on custom-defined prompts designed to draw out specific attributes associated with a user's goal. These same prompts may be output during live execution of the LLM. For example, a user may input a goal description and possibly other attributes.

The LLM can then use the description/attributes to generate a custom image that enables the user to visualize the goal. The prompts may be generated via prompt engineering that can be performed through the model training process, such as the model training process described above in the examples of FIGS. 3A-3C.

Prompt engineering is the process of structing sentences (prompts) so that the GenAI model understands them. A prompt may include a question about a product, a question about a location, a question about a user's intention, a request for a description from the user, and the like.

The prompt may also provide an amount to purchase, a price range, and the like. All of this information may be input to the LLM and used to create chat content that can be output by a chatbot during a chat conversation with a user. Part of the prompting process may include delays/waiting times intentionally included within the script so the model has time to think/understand the input data.

Figure 4A:
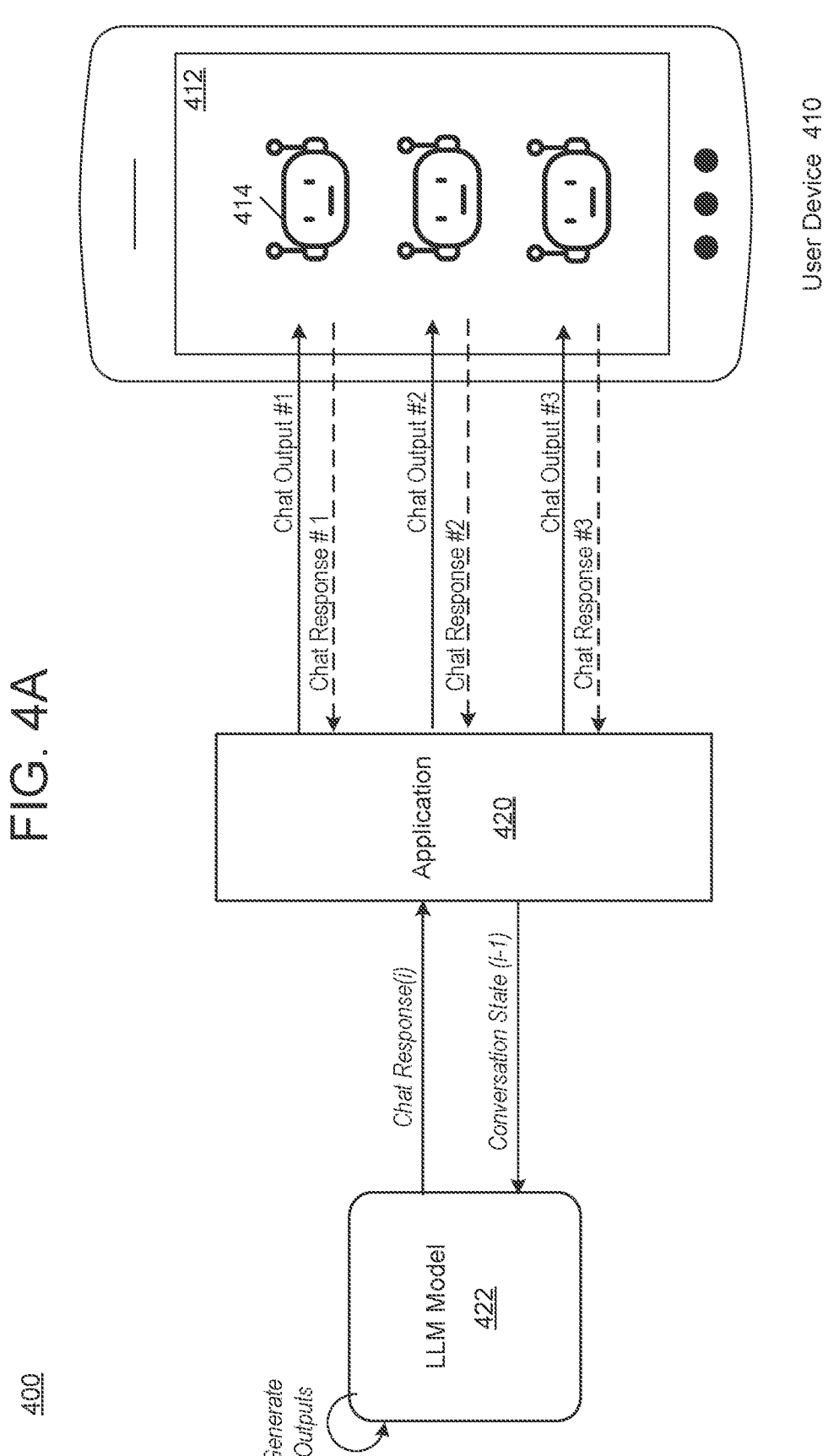
FIGS. 4A-4B are diagrams illustrating a process of outputting prompts via a chatbot within a chat window based on user context and content according to example embodiments.
Figure 4B:
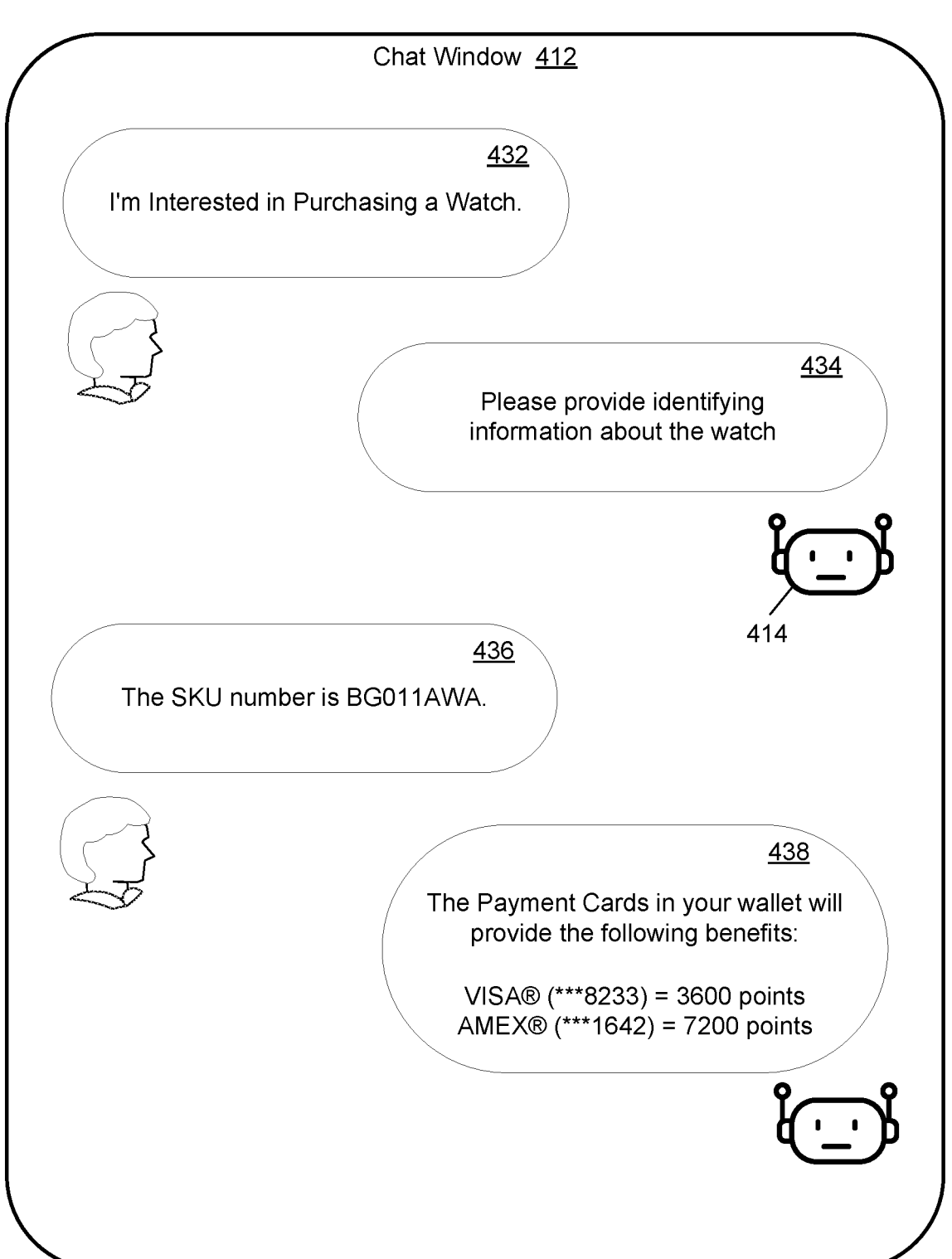

FIGS. 4A-4B illustrate a process of outputting prompts via a chatbot 414 within a chat window 412 on a user device 410 based on user context and/or content according to example embodiments. For example, FIG. 4A illustrates a process 400 of generating a sequence of outputs, which are output by a host application 420 via a chatbot 414 within a chat window 412 on a user device 410. In this example, the host application 420 may receive a sequence of inputs from a user during a conversation between the user and the chatbot 414 within the chat window 412 of the host application 420.

In response, the host application 420 may trigger execution of an LLM 422 on each input from the user to determine a next piece of text content to output via the chatbot, respectively, wherein each execution of the LLM 422 includes a new chat input from the user and a most-recent state of the conversation between the user and the chatbot

414 within the chat window 412. The LLM 422 may transfer the next output/response to the host application 420, which outputs the next output via the chatbot 414 within the chat window 412 on the user device 410.

Each execution of the LLM 422 may include a new conversation state input to the LLM 422 from the chat window 412. For example, the conversation state may include a history of all communications from the current session with the user performed via the chat window 412. Initially, the conversation state may be empty. Each time the user submits a query, the conversation state grows.

Each time the chatbot 414 responds, the conversation state grows. Furthermore, the more the conversation grows, the more accurate the responses may become from the LLM 422 because more data is being input to the LLM 422.

In some embodiments, the LLM 422 may be configured to try to obtain the most information in the shortest number of rounds of communication. Here, the LLM 422 may determine a goal/next goal of the conversation based on execution of the LLM on the new chat input and the most recent state of the conversation between the user and the chatbot. The LLM 422 can generate an additional response to be output by the chatbot based on execution of the LLM 422 on the next goal of the conversation.

FIG. 4B illustrates an example of a chat conversation that occurs within the chat window 412 of the user device 410, shown in FIG. 4A. Referring to FIG. 4B, the host application 420 may establish a connection with the user device 410, such as a secure network connection.

The secure connection may include a PIN, biometric scan, password, username, TTL handshake, etc., exchanged between the host application 420 and the user device 410.

In the example of FIG. 4B, the host application 420 may control the interaction of the LLM 422 on the host platform and the chatbot 414 displayed on the user device 410. The host application 420 may output queries on the chat window 412 of the user device 410 with requests for information from the user. The user may enter values into the fields on the user interface corresponding to the queries and submit/transfer the data to the host application 420, for example, by pressing a submit button, etc.

In this example, the host application 420 may combine the query with the response from the user interface and generate a conversation state submitted to the LLM 422. For example, each conversation may include a history of communications between the user and the chatbot until that point.

For example, the input to the LLM 422 may include the query 432 submitted by the user via the chat window 412 shown in FIG. 4B.

In response, the LLM 422 may generate a response 434, output via the chatbot 414 within the chat window 412. Here, the LLM 422 may use the text content from the query 432 to derive the response 434. However, as the conversation continues, the size of the data submitted to the LLM 422 may increase. For example, each additional response and query may be accumulated/aggregated with the current conversation state sent to the LLM 422 to generate a response. Thus, the LLM 422 continues to receive a larger data set. For example, the LLM 422 may receive the query 436, the response 434, and the previous query (i.e., the query 432) as inputs and output the response 438 in response.

In some embodiments, the host application 420 may deliberately add waiting times between submitting responses to the LLM 422 to ensure the model has enough time to "think" about the answer.

The waiting times may be integrated into the code of the host application 420, or they may be modified/configured via a user interface. Furthermore, the ordering of the prompts and the follow-up questions may differ depending on the answers given during the previous prompt or prompts.

In one embodiment, the current solution offers a chatbot 414 that can engage with users regarding payment card inquiries. When a user poses a question about a payment card, the processor utilizes the LLM 422, which in turn taps into a stored database of payment card information to construct a relevant response. On receiving a natural language query, the processor extracts relevant documents from the database and feeds both the query and these documents into the LLM to construct a more informed response. The processor can determine specific files within the database to provide responses based on the information contained within those files. Going beyond reactive answers, the processor can proactively generate and display prompts to guide the user's interaction based on previous conversation content. Combining the user's original query, generated prompts, the user's responses to those prompts, and the payment card database, the processor crafts highly contextual responses. The processor can navigate a conversation by determining the next best prompt based on the user's replies, previous prompts, and the payment card database. The processor ensures that the LLM is aptly trained on documents related to various payment card types, making its responses and interactions even more relevant. The processor can transmit a request via an API call to an external AI engine of the LLM, passing the LLM's identifier and the user's query, showcasing integration and flexibility.

Figure 5E:
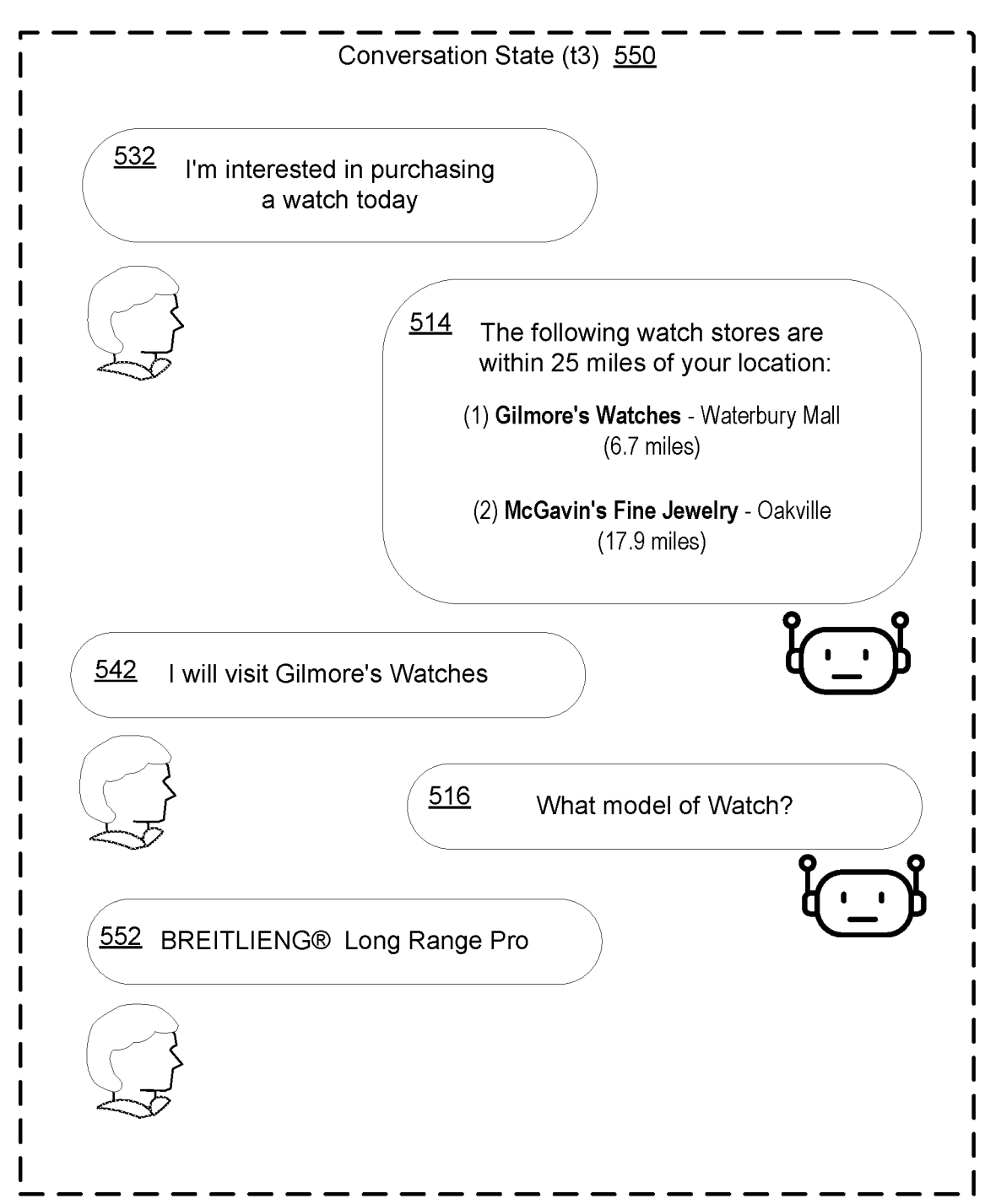

FIGS. 5A-5E are diagrams illustrating a process of generating chat content based on a dynamic conversation state according to example embodiments. For example, FIG. 5A illustrates a process 500 of a dialog manager 520 executing a conversation between a chatbot and a user via a chat window 512 on a user device 510. In this example, the dialog manager 520 manages communications between an LLM 522 and a chatbot 514 displayed on the chat window 512 of the user device 510. For example, content from the chat window 512 may be retrieved by the dialog manager 520 (e.g., via a software application, etc.) and input into the LLM 522. In response, the LLM 522 may generate a response.

In the example embodiments, the dialog manager 520 may extract a history of the conversation from the chat session with the user, including all communication in the chat window 512 up to that point. The history of the conversation may also be referred to herein as a "conversation state." The conversation state may include the chat content within the chat window 512 that has been output already. Thus, the conversation state may dynamically evolve each time a new communication is added to the chat window 512 by either the user or the chatbot 514 via the LLM 522.

In the example of FIG. 5A, the LLM 522 receives a conversation state 530 at a first time from the chat window 512 via the dialog manager 520 and generates an output 516 that is output within the chat window 512 via the chatbot 514. For example, the LLM 522 may execute on the input content and compare it to credit card documents to generate an output/response to the current state of the conversation. Here, the output 516 now becomes part of the conversation state.

In addition, the user may also respond to the output 516, which is not shown in the example of FIG. 5A.

The response will also become part of the conversation state. The output 516 and any response may be added to the conversation state 530 to generate a second conversation state 540.

The second conversation state 540 may be input to the LLM 522 via the dialog manager 520 to generate a next output (e.g., output 518). The output 518 may be output by the chatbot 514 within the chat window 512. The output 518 now becomes part of the conversation state.

The user may also respond to the output 518, which becomes part of the conversation state.

The resulting changes create a third conversation state 550 that includes the second conversation state 540 and the output 518 and any responses. This process may repeat on an iterative basis until the LLM 522 determines that the chat conversation should end or the user ends the conversation. Each iteration of the LLM 522 may determine whether the conversation should end.

For example, the LLM 522 may ingest the current conversation state and determine that the user's question has been resolved. If resolved, the host platform may time out the conversation and release the connection.

In one embodiment, the current solution ensures a responsive chatbot experience. Each time the user provides an input, the processor uses an LLM 522 to generate the next prompt. This isn't just based on the immediate user input but also considers the overall state of the conversation, dynamically adjusting its responses based on the generated next prompt. An initial interaction may begin with a generic prompt by the chatbot 514, and depending on the user's reply, the current solution refines the chatbot's subsequent prompts. The current solution may ensure the chatbot's adaptability doesn't end at the second prompt. Each new user input continues to shape the chatbot's questions. This current solution utilizes the history of the entire conversation to inform the LLM's responses, ensuring contextual consistency. In one embodiment, instead of passively waiting, the current solution may analyze inputs and the ongoing chat to decipher the user's likely goal, making interactions more proactive. This analysis may be performed by the LLM 522. When a conversation goal is detected, the current solution may ensure the chatbot's future prompts are aligned with that goal. The current solution doesn't just react; it learns. By processing past user conversations, the LLM is trained to be more effective in future interactions.

FIG. 5B illustrates an example of a chat conversation conducted between the chatbot 514 and a user via the chat window 512.

In this example, the content within the outputs 516, 517, and 518 is now visible. In addition, the user responses 532, 542, and 552 are also input to the chat window 512 by the user input commands on a keypad, mouse, touch screen, speech, etc. The sequence/order in which the content is added to the chat window 512 may be maintained by the dialog manager 520 and used by the LLM 522 when generating an output to be performed by the chatbot 514. The conversation state that input to the LLM 522 may be dynamically generated based on the current content within the chat window 512.

For example, FIG. 5C illustrates an example of the conversation state 530 shown in FIG. 5A based on the chat that has occurred, as shown in FIG. 5B. Here, the conversation state includes the user response 532 from the user, which includes a natural language input such as a description, a query, an answer, or the like provided by the user. In response, the LLM 522 may generate the response/output 516. In this example, the user response 532 includes a query about purchasing a watch. The output 516 generated by the LLM 522 includes a listing of all watches stored within a predetermined radius of the user's current location. The user's current location may be received by the LLM 522 from the user device 510.

In the example embodiments, the LLM 522 may automatically list all stores within a predetermined radius and ask the user to select the store they plan to visit. The LLM 522 can be designed to generate the answer in as few interactions as possible. The LLM 522 can attempt to find out more information to help resolve any lack of clarity. For example, FIG. 5D illustrates an example of the second conversation state 540, the next conversation state input to the LLM 522 with respect to the conversation state 530. Here, the second conversation state 540 includes the user response 532, the output 516, and the user response 542 from the user. The second conversation state 540 is input to the LLM 522, which generates the output 517 in response.

FIG. 5E illustrates an example of the third conversation state 550. In this example, the third conversation state 550 includes the second conversation state 540 in addition to the output 517 and the user response 552 from the user.

The third conversation state 550 is extracted from the chat window 512 and input to the LLM 522, which generates output 518 in response. The conversation state may continue to dynamically accumulate more content as the conversation continues.

Figure 6A:
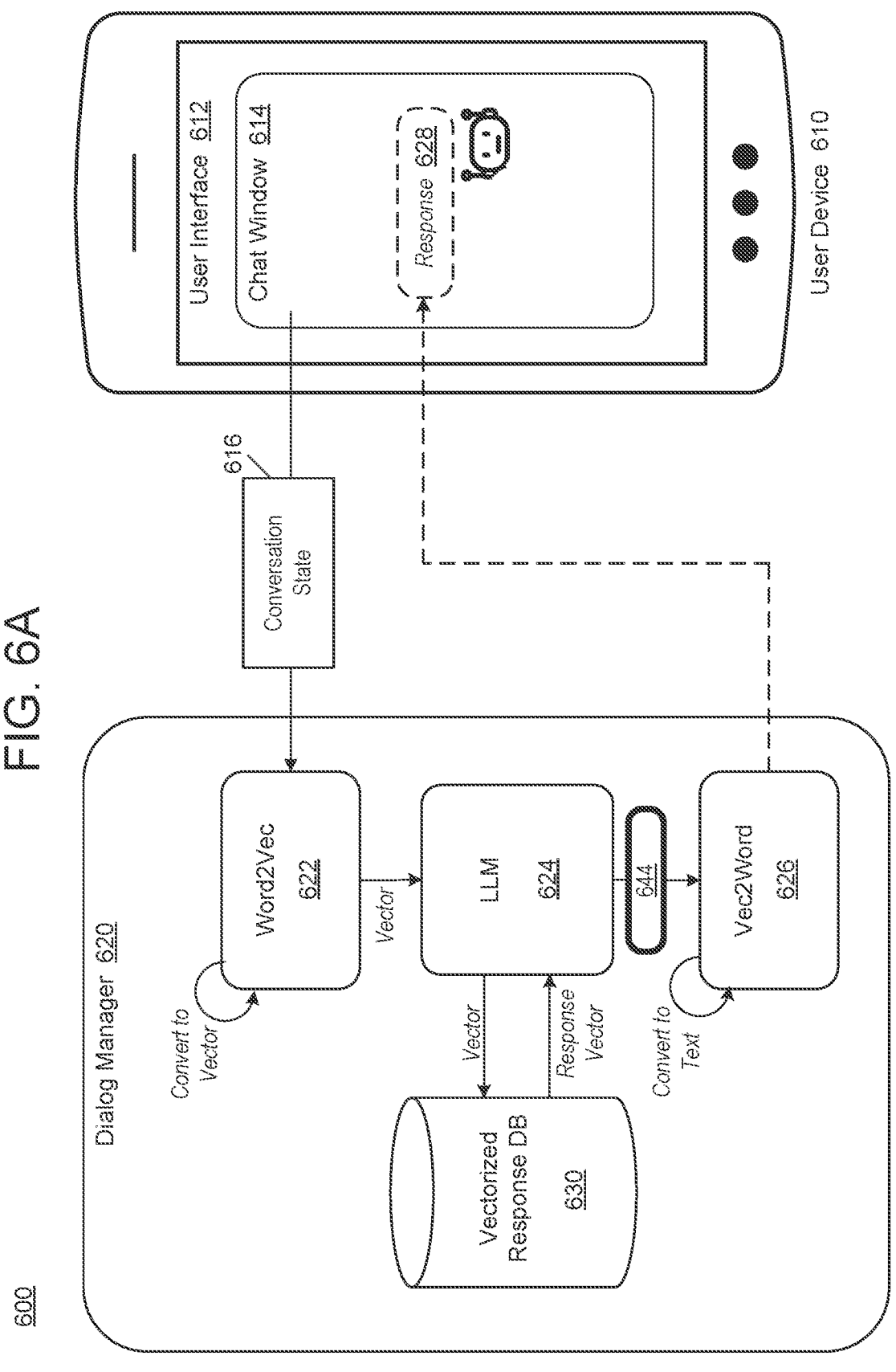
FIGS. 6A-6B are diagrams illustrating a process of a chatbot that includes a vectorized response database according to example embodiments.
Figure 6B:
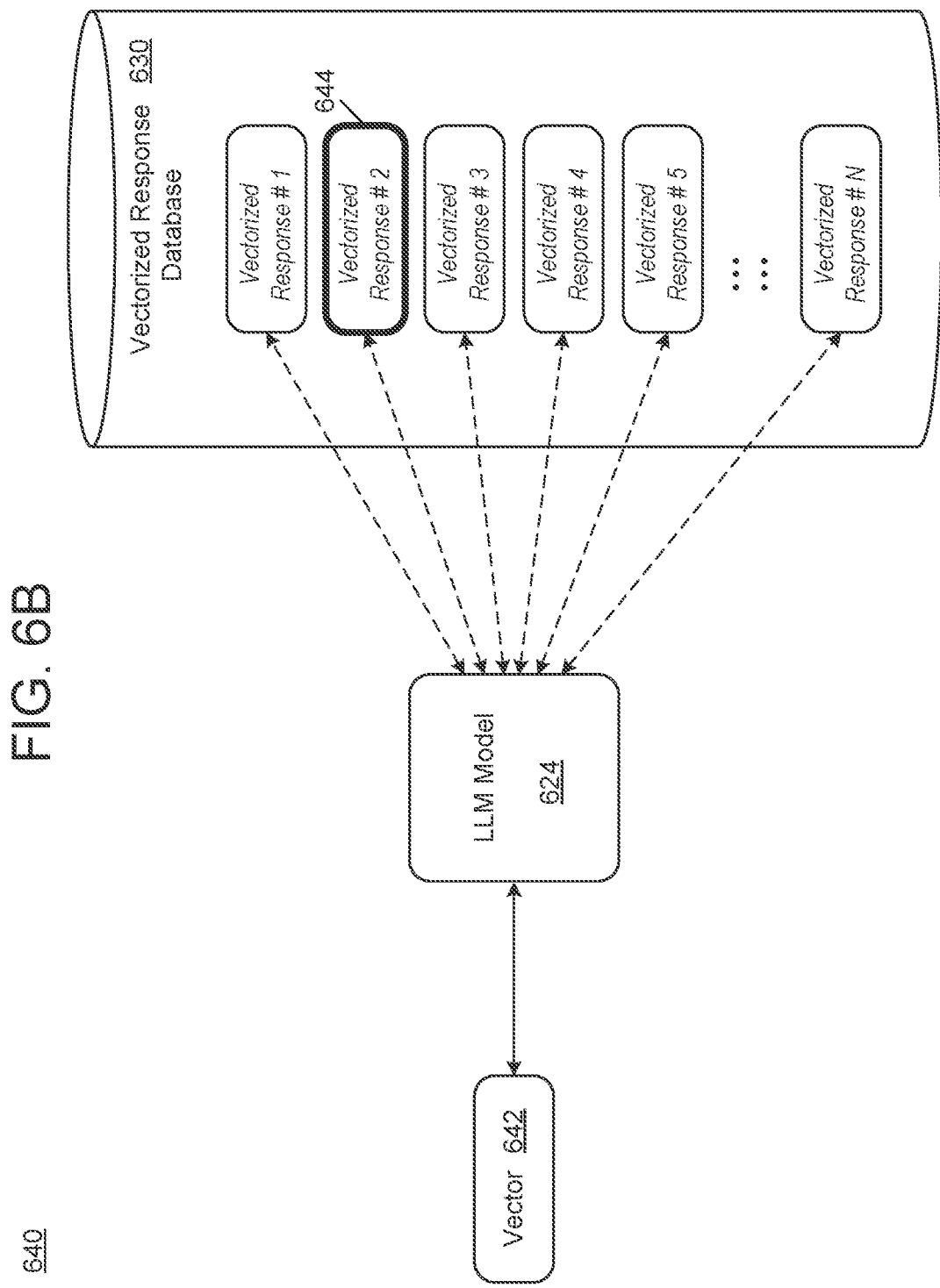

FIGS. 6A-6B illustrate a chatbot process that outputs chat responses from a database 630 of vectorized responses according to example embodiments. For example, FIG. 6A illustrates a process 600 of receiving a conversation state 616 from a user device 610 and identifying a vectorized response within the database 630 corresponding to the conversation state 616. In this example, the conversation state 616 is retrieved by a dialog manager 620 on a host platform (such as a cloud platform, web server, etc.) Here, the dialog manager 620 calls a word-to-vector model 622, which converts the text content within the conversation state 616 into a vector and inputs the vector to an LLM 624.

The LLM 624 then performs a vector space comparison of the vector to a plurality of vectors (i.e., vectorized responses) stored within the database 630. An example of the vector space comparison is shown in FIG. 6B. In particular, FIG. 6B illustrates a process 640 of identifying a vectorized response within the database 630. Here, the LLM 624 may perform a similarity analysis within vector space using cosine similarity or the like. The cosine similarity function measures the similarity between two vectors within the vector space/product space. It is measured by determining the cosine of the angle between the two vectors and whether they are pointing in the same direction. In the example of FIG. 6B, the LLM 624 compares the vector 642 to each of a plurality of vectors (vectorized responses) stored within the database 630 and selects a vector 644 that most closely matches the vector 642 in vector space as the response vector.

Returning again to FIG. 6A, the vector 644 may be input to a vector-to-word model 626, which converts the vector 644 to text and outputs the text via the chatbot 616 in the chat window 614 on the user interface 612 of the user device 610. This process may be iteratively repeated. By keeping a database of vectors, the LLM 624 can operate on vector content rather than text content, making the LLM 624 more efficient due to less processing time.

The apparatus initiates with a chat conversation involving user prompts and chatbot responses. The user's text input is translated into a mathematical representation called a vector using techniques, such as a word-to-vector model 622. or FastText. The current solution then consults a pre-existing database 630 of vectorized responses to discern which vector 644 most closely corresponds to the user's input vector. Having identified this, the response vector is transformed back into a comprehensible text response, which the chatbot showcases to the user in the software's chat window 614.

Because conversation context is crucial. The current solution, realizing this, aggregates the vectors of the current user input, past user inputs, and past chatbot outputs. This amalgamation offers a richer context, allowing the LLM 624 to generate more apt responses.

In one embodiment, the current solution, using vector space models, places both the user's input vector and the database vectors in a multi-dimensional space. Identification of the most suitable response is based on proximity measures in this space between the user's vector and the potential response vectors. The current solution uses cosine similarity—a measure to understand the cosine of the angle between two vectors—to determine similarity. The closer the value is to 1, the more similar the vectors. Thus, the current solution matches the user input vector to the database vector that has the highest cosine similarity score.

To speed up future interactions and continually refine its understanding, the current solution stores the mapping between a particular user input vector and its chosen vectorized response in the database. The LLM may not be restricted to only selecting from pre-existing vectorized responses. It can dynamically generate new text based on the user's vector, enhancing its original response with this fresh content. The LLM isn't solely reactive; it can also be proactive by outputting prompts to guide the conversation. For instance, if the vector indicates ambiguity or a need for more details, the LLM can query the user for more specifics.

Figure 7A:
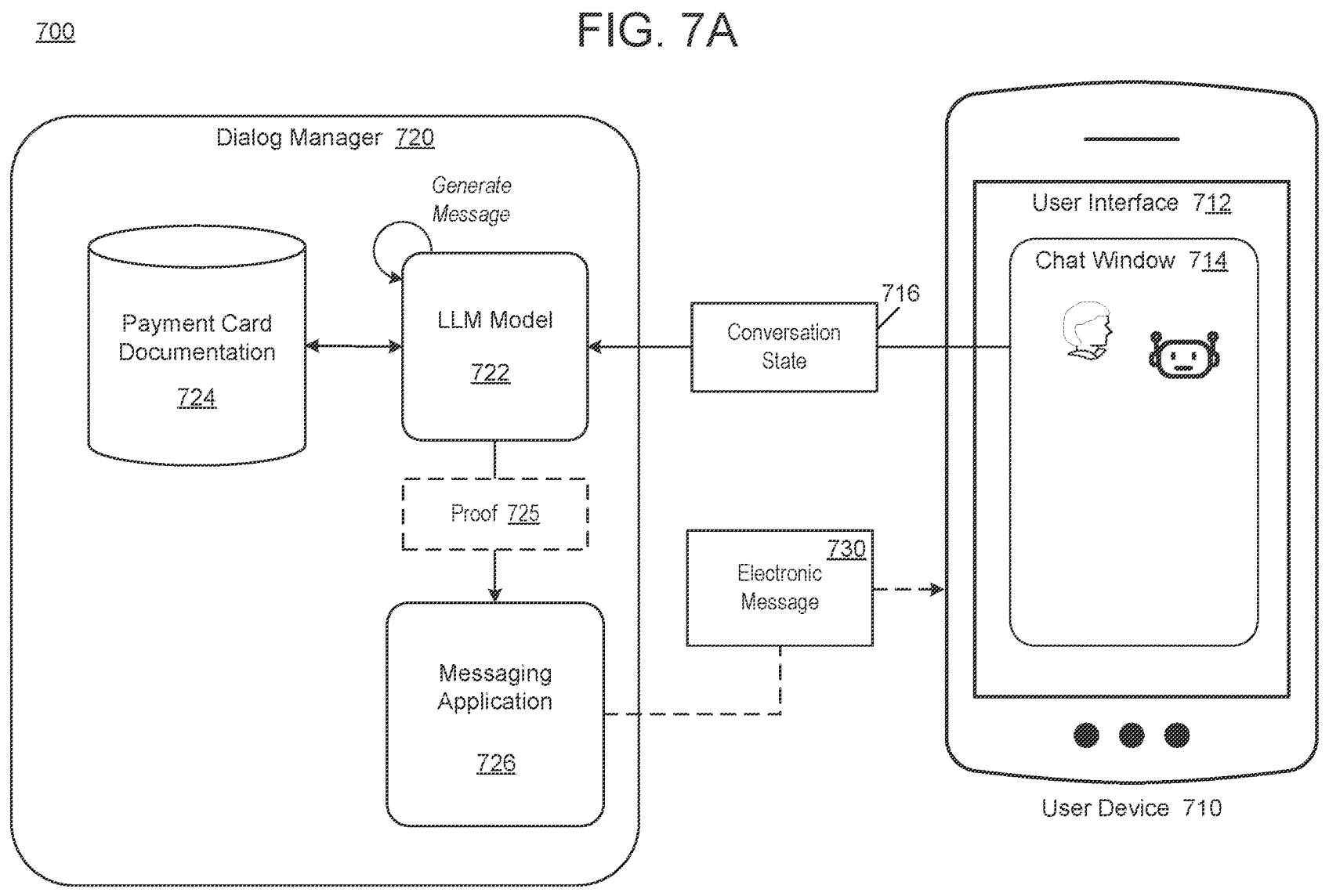
Figure 7B:
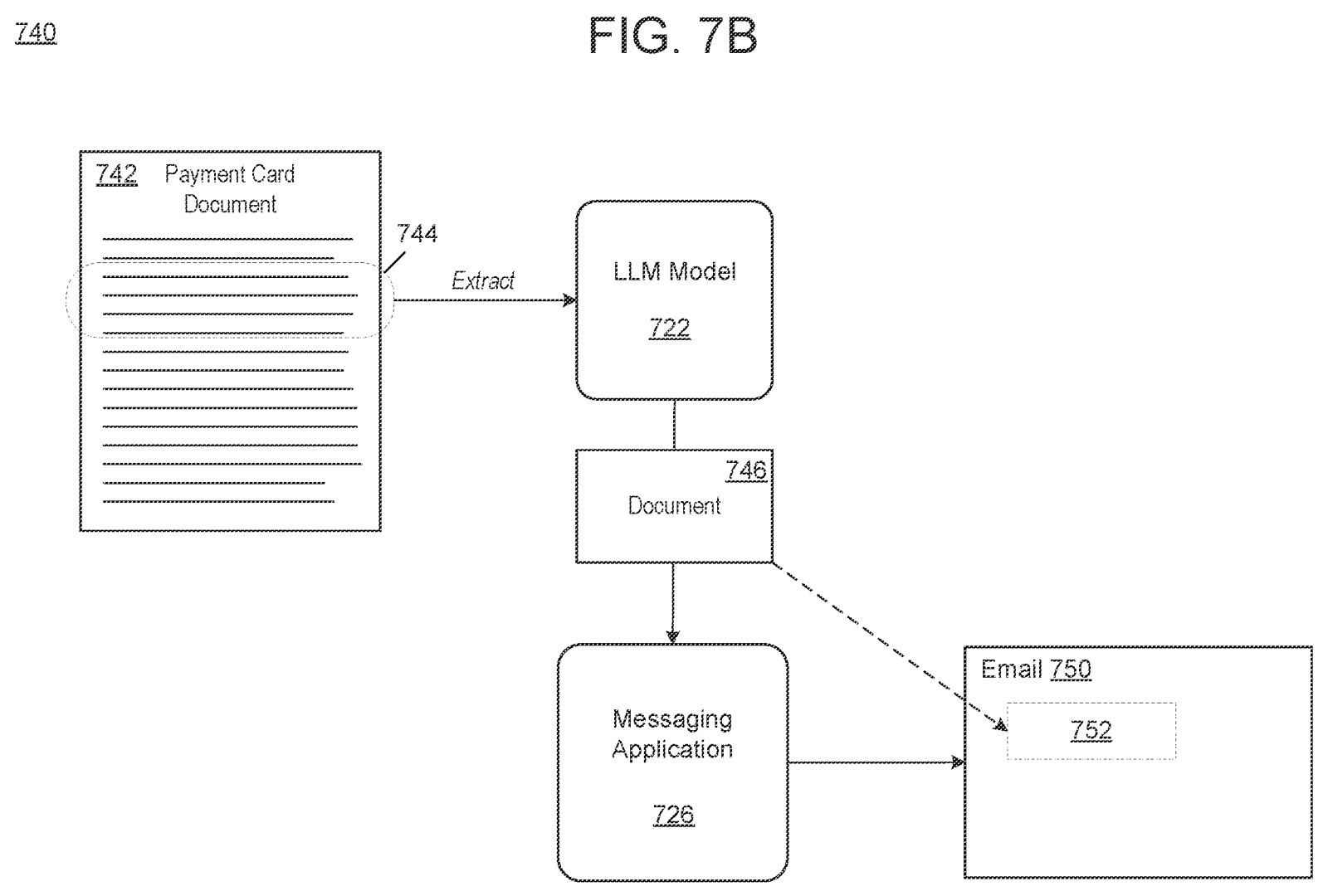

FIGS. 7A-7B illustrate a process of generating and sending a confirmation letter to a user device according to example embodiments. For example, FIG. 7A illustrates a process 700 of generating an electronic message 730 based on execution of an LLM 722 on a conversation state 716 from a chat window 714 displayed on a user interface 712 of a user device 710. In this example, a user and a chatbot are conversing via the chat window 714. The responses output by the chatbot may be generated by the LLM 722.

In this example, the LLM 722 may receive the conversation state 716 and determine to generate a letter of confirmation based on the conversation state 716. For example, the LLM 722 may identify keywords, a sequence of keywords, a pattern of communication, or the like, which indicates that the user needs proof of a card benefit. The LLM 722 may identify the proof of the benefit from/within documents stored in a database 724. Here, the dialog manager 720 may control the LLM 722 to extract/read content from a document stored within the database 724 and identify proof 725 of the benefit stored therein. For example, the proof 725 may include a paragraph, page, quote of text, document, etc., which includes the proof of the benefit.

The proof 725 may be embedded within a body of the electronic message 730 by a messaging application 726, which receives the proof 725 from the LLM 722 and adds it to the electronic message. The messaging application 726 may also identify an electronic address such as an email address, a phone number, or the like, and transmit the electronic message 730 to the address via a network such as the Internet.

For example, FIG. 7B illustrates a process 740 of extracting content 744 from a document 742 and attaching the content 744 to an electronic mail 750. In this example, the LLM 722 may identify the content 744 based on the conversation state 716, which includes a request for proof of a benefit. In this example, the LLM 722 may extract only a portion of content or generate a description of such a portion of content and add it to a separate document, file, etc. For example, the LLM 722 may generate a document 746, including content 744, such as a description of the benefit. The document 746 may be a word processing document, a digital document such as a PDF, an extensible markup language (XML) file, a JavaScript Object Notation (JSON) file, and the like. As another example, the messaging application 726 may attach the document 746 as an attachment 752 to the email and send the email to the user. As another example, the messaging application 726 may embed document 746 within the electronic mail 750 body. The user may open the document on their device and view the benefit on the chat window, user interface, etc. Furthermore, the user may even show the document to another person, such as a ticket counter, etc.

In one embodiment, a database containing detailed credit card documentation 742 may contain high-speed data access, such as via solid-state drives or high-speed random-access memory (RAM). This documentation may be structured in a hierarchical manner with metadata for quick indexing. When a user initiates a conversation via a chatbot interface 714 in an application, a processor executing the instant solution employs Natural Language Processing (NLP) to understand the query's characteristics. For example, if the user inquires about credit card benefits, the processor identifies the context and uses the LLM 722 to extract appropriate data from documentation 744. Subsequently, a tailored letter of confirmation 746 is formulated. This letter is then converted to a format suitable for transmission (e.g., PDF), encapsulated in an electronic message, and sent to the user's device 710. When the LLM identifies a user's credit card benefits, it can format this information into an interactive, detailed digital document, such as a hyperlinked PDF or an interactive web page, for example. This document may not be only a static text but might include links to related offers, terms, and conditions or even video explainers. The LLM detects if a product identifier is correlated with any relevant credit card offers, promos, or cashback from the stored documentation. For example, the product identifier may be "MacBook." This correlation is achieved through a combination of keyword matching, context recognition, and potentially semantic understanding.

The LLM 722 may not generate comprehensive letters or documents. In some examples, actionable and concise text responses are formed. The processor pushes these responses in real-time to the software application's UI 712, ensuring a seamless user experience. The processor, in tandem with an integrated user management subsystem, can retrieve a registered email address of the user. The processor may utilize an integrated SMTP service or an API call to a third-party mailing system to send out the message with the confirmation letter.

The LLM 722 may identify specific benefits sections within the broader credit card documentation. Using parsing functionality, the instant solution may then extract just this relevant content 744. This snippet is especially useful for users wanting specific, pinpointed information without the bulk of full documentation. The apparatus can be integrated with transaction processing systems. When a financial transaction occurs on the user's device 710, the details can be fed into the LLM, which then relates the transaction type with potential benefits or offers. The processor can direct specific content to not just an email or UI but also dedicated mobile applications. Using API calls, the processor can push the extracted credit card benefit content to an app, which then may display it in a user-friendly manner.

Figure 8A:
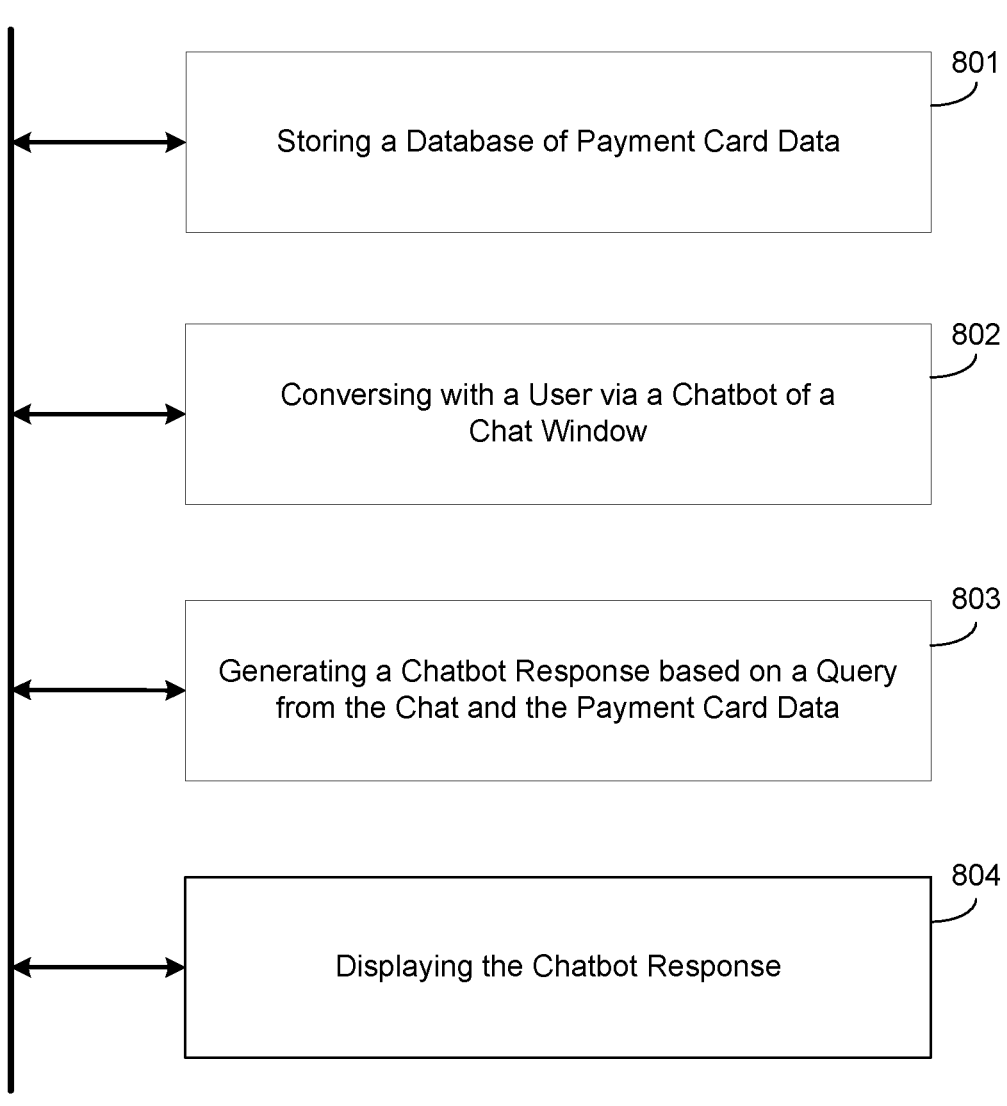
FIG. 8A is a diagram illustrating a method of chatting with a user about a payment card of the user according to example embodiments.

FIG. 8A illustrates a method 800 of chatting with a user about a user's payment card according to example embodiments. As an example, the method 800 may be performed by a computing system, a software application, a server, a cloud platform, a combination of systems, and the like.

Referring to FIG. 8A, in 801, the method may include storing a database of payment card data. In 802, the method may include conversing with a user via a chatbot within a chat window of a software application, wherein the conversing comprises receiving a query from the user about a payment card during a chat session between the user and the chatbot.

In 803, the method may include executing a large language model (LLM) on the query about the payment card and the database of payment card data to generate a chatbot response. In 804, the method may include displaying the generated chatbot response via the chatbot within the chat window of the software application during the chat session. In some embodiments, the receiving the query comprises receiving a natural language input via the chat window, and the method further comprises extracting a corpus of documents from the database and inputting the natural language input and the corpus of documents to the LLM to generate the chatbot response.

In some embodiments, the executing may include generating the chatbot response based on the execution of the LLM on payment card data stored within one or more files within the database. In some embodiments, the method may further include generating an output and/or a prompt based on execution of the LLM on conversation content from the chat window and displaying the output via the chatbot within the chat window. In some embodiments, the method may further include receiving a response from the user to the output, and the executing comprises executing the LLM on the query, the output, the response, and the payment card data to generate the chatbot response.

In some embodiments, the method may further include receiving a response from the user to the output, determining a next output based on execution of the LLM on the query, the output, the response, and the payment card data, and displaying the next output via the chatbot within the chat window. In some embodiments, the method may further include training the LLM based on execution of the LLM on a corpus of database documents associated with one or more of a credit card, a debit card, and a payment card. In some embodiments, the executing may include transmitting an application programming interface (API) call to an artificial intelligence (AI) engine of the LLM with an identifier of the LLM and natural language content from the query.

FIG. 8B illustrates a method 810 of executing a large language model for a chatbot based on a dynamic conversation state according to example embodiments.

As an example, the method 800 may be performed by a computing system, a software application, a server, a cloud platform, a combination of systems, and the like. Referring to FIG. 8B, in 811, the method may include receiving a sequence of inputs from a user during a conversation between the user and a chatbot within a chat window of a software application. In 812, the method may include executing a large language model (LLM) on each input from the user to determine a next output to output via the chatbot, respectively, wherein each execution of the LLM includes a new chat input from the user and a most-recent state of the conversation between the user and the chatbot within the chat window. In 813, the method may include displaying the next output within a chat window on a user device with a description of the identified benefit obtained.

In some embodiments, the method may include displaying a first output by the chatbot via the chat window, receiving a first natural language input via the chat window in response to the first output, and generating a second output by the chatbot via the chat window based on execution of the LLM on the first output and the first natural language input. In some embodiments, the method may include receiving an additional natural language input from the chat window and generating an additional output by the chatbot based on execution of the LLM on the second output and the additional natural language input. In some embodiments, the method may include receiving a history of the conversation between the chatbot and the user, including identifiers of user dialogue and chatbot dialogue, and generating the next output based on execution of the LLM on the history of the conversation.

In some embodiments, the method may further include determining a next goal of the conversation based on execution of the LLM on the new chat input and the most recent state of the conversation between the user and the chatbot. In some embodiments, the method may further include generating an additional output to be output by the chatbot based on execution of the LLM on the next goal of the conversation. In some embodiments, the method may further include training the LLM based on execution of the LLM on a corpus of documents from the database, which are associated with user historical conversations.

FIG. 8C illustrates a method 820 training an LLM for a chatbot according to example embodiments. As an example, the method 820 may be performed by a computing system, a software application, a server, a cloud platform, a combination of systems, and the like. Referring to FIG. 8C, in 821, the method may include training a large language model (LLM) to learn credit card data via execution of the LLM on content from one or more credit card documents. In 822, the method may include executing the LLM to generate a sequence of prompts, which are output to a user via a chatbot within a chat window of a software application.

In 823, the method may include receiving responses to the sequence of prompts for the user via the chat window of the software application. In 824, the method may include retraining the LLM model to further learn credit card data via execution of the LLM on a combination of the sequence of prompts and the received responses.

In some embodiments, the receiving may include receiving a sequence of responses in response to the sequence of prompts and retraining the LLM based on an order of the sequence of prompts and an order of the sequence of responses to the prompts, respectively. In some embodiments, the training may include training the LLM model to understand a correlation between a product identifier and a credit card benefit based execution of the LLM on the sequence of prompts and the sequence of prompts. In some embodiments, the executing may include receiving a history of the conversation between the chatbot and the user, including identifiers of user dialogue and chatbot dialogue, and generating a prompt based on execution of the LLM on the history of the conversation and the one or more credit card documents.

In some embodiments, the method may further include deploying the LLM within a live runtime environment on a host platform, and logging runtime data of the LLM as the LLM generates the runtime data within the live runtime environment. In some embodiments, the method may further include retraining the LLM based on execution of the LLM on the logged runtime data. In some embodiments, the method may further include extracting content from a credit card document stored within a database based on a response to a prompt from among the sequence of prompts and displaying the extracted content via the chat window.

In some embodiments, the method may further include generating a next prompt with respect to the prompt based on execution of the LLM on the extracted content from the credit card document.

FIG. 8D illustrates a method 830 of a chatbot generating responses using a database of vectorized responses according to example embodiments. As an example, the method 830 may be performed by a computing system, a software application, a server, a cloud platform, a combination of systems, and the like. Referring to FIG. 8D, in 831, the method may include receiving an input from a user during a conversation that includes a plurality of prompts between the user and a chatbot within a chat window of a software application. In 832, the method may include converting text content within the received input into a vector. In 833, the method may include executing a large language model (LLM) on the vector and a database of vectorized responses to identify a vectorized response to output from among the plurality of vectorized responses within the database. In 834, the method may include converting the vectorized response into a text response.

In 835, the method may include displaying the text response output by the chatbot within the chat window of the software application.

In some embodiments, the converting may include converting previous responses from the user and previous outputs by the chatbot within the chat window into the vector and identifying the vectorized response based on an aggregation of the received input, the previous responses from the user, and the previous outputs by the chatbot. In some embodiments, the executing may include comparing the vector to a plurality of vectors corresponding to the plurality of vectorized responses in vector space and identifying the vectorized response based on a distance between the vector and a corresponding vector of the vectorized response.

In some embodiments, the executing may include executing a cosine similarity of the vector and the plurality of vectors and identifying the vectorized response based on the execution of the cosine similarity. In some embodiments, the method may further include storing a mapping between the vector and the vectorized response within the database of vectorized responses. In some embodiments, the method may further include generating additional text content for the text response based on execution of the LLM on the vector and displaying the text response with the additional text content. In some embodiments, the method may further include executing the LLM on the vector and the database of vectorized responses to identify a prompt and outputting the prompt by the LLM via the chat window.

FIG. 8E illustrates a method 840 of generating a letter of recommendation of benefits according to example embodiments. Referring to FIG. 8E, in 841, the method may include storing a data store of credit card documentation.

In 842, the method may include conversing with a user via a chatbot within a chat window of a software application, wherein the conversing comprises receiving natural language inputs with requests for information about a payment card. In 843, the method may include identifying a benefit obtained by the user based on the conversation. In 844, the method may include executing a large language model (LLM) on the identified benefit and the credit card documentation data store to generate a confirmation letter. In 845, the method may include generating an electronic message with the letter of confirmation attached and transmitting the electronic message to a user device.

In some embodiments, the method may further include generating a digital document based on execution of the LLM on the identified benefit and content extracted from the credit card documentation and transmitting the digital document to the user device with the electronic message. In some embodiments, the identifying may include identifying a correlation between the benefit and a product identifier included in the natural language inputs based on execution of the LLM on the identified benefit and the data store of the credit card documentation. In some embodiments, the method may further include generating a text-based response based on execution of the LLM on the identified benefit and the data store of the credit card documentation and transmitting the text-based response to a user interface on the user device.

In some embodiments, the method may further include looking up an email address of the user and transmitting the electronic message with the letter of confirmation attached to the user's email address via an electronic messaging service. In some embodiments, the method may further include identifying a portion of content within a digital document of the credit card documentation that corresponds to the benefit, extracting the portion of content, and transmitting the portion of content to the user device with the electronic message.

In some embodiments, the method may further include receiving content from a financial transaction that is being conducted by the user device, and identifying the benefit based on execution of the LLM on the content from the financial transaction. In some embodiments, the method may further include extracting content from the credit card documentation that corresponds to the benefit and transmitting the extracted content to a mobile application installed on the user's device.

In one embodiment, the instant solution's chatbot has highly intuitive abilities and is able to offer insightful answers to the user's queries based on the large language model of charge card data about the user. This embodiment is centered around the chatbot's ability to connect the dots between the user's life events and charge card benefits. For example, through previous transactions, the chatbot determines that the user's anniversary is coming up, and it might suggest booking a romantic getaway because the charge card offers special discounts at luxury resorts in which the user can earn double reward points. This level of intuitiveness ensures that the user not only gets the most out of their charge card but also receives timely advice tailored to their life events. In another example, a user informs the chatbot that they are planning a vacation or business trip, and the chatbot analyzes the user's charge card data and current card benefits via the large language model, and in response, it provides tips about the charge card, such as using the card at a specific hotel in the destination city to receive a complimentary room upgrade or to visit the card member lounge at the airport for a complimentary beverage.

In one embodiment, the instant solution's chatbot gains insights about the user through prior conversations and the large language model of data, and with the chatbot's access to exclusive partnerships, it can present the user with invitations to exclusive events, experiences, or deals that are not offered to the public. For example, the charge card company has partnered with various luxury brands and lifestyle companies. The intuitive chatbot identifies an exclusive wine-tasting event that would be enticing to the user based on the user's elite status and charge card trends. The chatbot informs the user that he is eligible for this invitation-only event and asks if he would like to be added to the private guest list. In another example, the chatbot becomes a gateway for early access to highly anticipated product launches. If there is a new tech product being launched and the user has previously shown interest in similar items, the chatbot can inform the user that with their elite cardholder status, the user has the privilege to pre-order and reserve the product before the public, thus bypassing wait lists and long lines. In addition, the chatbot informs the user that an extended warranty on tech purchases is included this month when purchases are made with their charge card.

In one embodiment, the instant solution's chatbot uses the large language model of charge card data to recognize not only the spending habits of the user but also the subtle patterns that reflect the user's lifestyle. Using these patterns along with the user's profile and preferences, the chatbot becomes a lifestyle strategist and makes suggestions that will further enrich the user's lifestyle. For example, the chatbot observes a pattern in which the user opts to round up their charge card transactions to benefit a selected charity, indicating that making charitable donations is important to the user. The chatbot identifies charities with donation-matching opportunities if the user donates using their charge card. In another example, the chatbot observes a pattern of late-night purchases (ordering food or performing online transactions), leading the chatbot to determine that the user is more active in the evenings. With this insight, the chatbot identifies exclusive cardholder events such as late-night-at-the-museum during special exhibits and offers discounted tickets when purchasing with the charge card.

In one embodiment, while the instant solution is using the chatbot and the large language model in determining the benefit, it is also using adaptive learning in parallel to determine if the user is familiar with the terminology being used by the chatbot in the conversation, and upon detecting that the user appears confused by the words, the instant solution dynamically adjusts the subsequent responses accordingly while continuing to help the user determine their benefit. For example, when the user starts a conversation with the chatbot, the chatbot responds with general terminology related to the topic, as a baseline. If the chatbot detects the user does not understand its choice of words or sentence structure, the chatbot adjusts its responses to use simpler vocabulary and more succinct explanations. Conversely, if the user is comprehending the conversation with ease, the chatbot continues with its current response style. Additionally, if the chatbot's assumptions about the user's familiarity are incorrect, the chatbot can learn from the user's feedback to better adapt to similar situations in the future. Over time, with continuous feedback and adaptive learning, the chatbot can quickly and accurately gauge a user's familiarity level and respond accordingly with effective prompts.

In one embodiment, the instant solution uses contextual quizzing for the chatbot to interact with the user, as well as using the large language model to identify the benefit. The contextual quizzing allows the chatbot to interact with the user using simple terminology and relatable scenarios on the topic. The short interactive nature of the quiz quickly narrows down the user's situation, providing insights as well as revealing any issues. In addition, incorporating a user feedback loop into the chatbot's interactions with the user provides valuable input so that the instant solution can more accurately understand users' needs in fewer steps.

In one embodiment, the instant solution uses emotional analysis with its large language model to gauge the user's emotional state, allowing for greater insight while the user is interacting with the chatbot. As the user responds with a sequence of statements or questions, the instant solution dynamically assesses textual indicators. For example, if the user seems frustrated or confused based on the phrasing or word choice of their response, the emotional data is collected and fed back into the large language model to be used along with the user's responses and the current state of the conversation in determining the next prompt. This approach ensures that the chatbot is informative as well as sympathetic to the user's responses. In another example, if the chatbot identifies that the user prefers exclusive benefits, it can frame the information about the exclusive benefits in a manner that resonates with the user's current emotional state. This approach might reach the answer more quickly if the user feels like the chatbot is listening and understanding their concern.

In one embodiment, the instant solution integrates emotional analysis capabilities with the chatbot and the large language model, enabling the solution to discern the context of the users' emotions. For example, if a user responds with words that indicate apprehension about a charge card's annual fee, the instant solution detects the sentiment and informs the user about potential benefits that might be of interest and offset the card's annual fee. The instant solution's retraining of the large language model could involve assimilating the charge card documents in addition to refining the contextual recognition of emotions from the user responses. Over time, it will become adept at navigating conversations with a level of awareness of the user's feelings, making the user's experience more personal.

In one embodiment, the instant solution integrates collaborative learning into the large language models where multiple specialized models can work together rather than relying on a single model. These models would share insights and learnings with each other. For example, one model might be specialized in analyzing charge card documents, while another model is experienced in interpreting user responses, and another model might be trained to generate intuitive prompts. As a user interacts with the chatbot, their responses are assessed collectively by these specialized large language models, which then collaborate to offer the most relevant response about the card benefits. Retraining occurs in a synchronized manner, with each model refining its specialization and contributing to the collective knowledge.

In one embodiment, the instant solution's vectorized responses incorporate a comprehensive view of the user's history, preferences, and issues. Using the integrated large language model and the database of vectorized solutions, benefits, and user inquiries, the solution considers the user's previous interactions so that the answer provided by the chatbot is not just a generic response but one that is tailored to the user and will also anticipate the user's further questions or concerns. The response displayed to the user goes beyond the obvious answers and streamlines the interaction as it proactively anticipates the user's needs. For example, a user's cumulative history, including shopping queries, past purchase history, and prior chatbot interactions is transformed into a vector that contains the nuances of the user's charge card history. The solution would execute the large language model and access the database of vectorized product descriptions, reviews, and common queries. By comparing the user vector with the database, the solution could identify potential product recommendations or answers. Instead of suggesting items based on only the current query, the displayed response would consider the broader context of the user's shopping habits, preferences, and past interactions, thereby offering personalized advice or product suggestions that might not be immediately evident but are highly relevant to the user.

In one embodiment, the instant solution acts as a shopping advisor for energy-saving solutions while using the large language model and vectorized database. For example, as users become more environmentally conscious, they might retrofit their homes to be more energy efficient. During the chatbot interaction, the user describes their home's current energy consumption, the types of appliances, and their desired sustainability goals. The instant solution vectorizes the input from the user's conversation with the chatbot, and while using the large language model and a database populated with vectorized green home retrofitting solutions, government incentives, and product reviews, the instant solution returns a response that is customized for the user's situation and assists the user in reaching their green home sustainability goals without financial stress.

In one embodiment, the instant solution's chatbot and large language model provide additional proactive assistance after identifying the benefit and generating the letter of confirmation. For example, a user who is stranded in a foreign country engages the chatbot in a conversation to ask how their charge card can help them during a sudden emergency, such as a natural disaster or political unrest. The intuitive chatbot understands the seriousness of the situation, identifies the emergency travel benefit provided by the charge card, and generates a confirmation letter detailing how the card benefit can assist in evacuations or emergency travel arrangements. The message with the letter of confirmation is transmitted to the user's device. In addition, if the emergency is related to political unrest, the instant solution could provide additional reassurance to the user by supplying directions to their local embassy and proactively informing the embassy about the user's situation.

In one embodiment, the instant solution provides supporting materials that the user can use as evidence of their card benefits. For example, a user is planning to reserve a car rental and is unsure if they should purchase additional insurance through the car rental company. The user initiates a conversation with the chatbot to ask if the car rental company's insurance is necessary if the rental is paid using the charge card. The chatbot identifies the collision damage waiver benefit from the charge card documentation, and a letter of confirmation is generated detailing the coverage provided by the card if the user decides to decline the car rental company's insurance. The chatbot sends the letter of confirmation, ensuring the user has the necessary materials to show to the insistent salesperson at the car rental company.

In one embodiment, Generative AI (GenAI) is used to transform data. The process of GenAI may begin with the preprocessing of input data or raw data. The preprocessing process may be comprised of normalization, outlier detection, anonymization, and the handling of missing values to ensure data integrity and consistency. When the input data is structured, GenAI facilitates data augmentation. Data input related to financial institutions may be imbalanced or lack a variance required for robust analysis. Data augmentation may include the generation of synthetic transactions or modeling hypothetical market scenarios to bolster the dataset's diversity and volume. Techniques that may be utilized may include bootstrapping or synthetic minority over-sampling, which address data imbalances, especially in areas like fraud detection, where certain event classes are sparse.

In the instant solution, the use of software tools, such as Generative Adversarial Networks (GANs) and Variational Autoencoders (VAEs), which are trained on input datasets to produce entirely new yet coherent data points. For example, these or similar tools may be employed to generate synthetic customer profiles for testing new financial products, simulate financial markets under various conditions, or even model the potential impact of unforeseen economic events.

Post-generation, the synthetic data's quality is evaluated. This evaluation may involve comparing the synthetic data with historical real-world data, running statistical tests to ensure distributions match, and/or the use of discriminator components of GANs as a litmus test for data realism.

The above embodiments may be implemented in hardware, in a computer program executed by a processor, in firmware, or a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 9 illustrates an example computer system architecture, which may represent or be integrated into any of the above-described components, etc.

FIG. 9 illustrates an example system 900 that supports one or more of the example embodiments described and/or depicted herein. The system 900 comprises a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be in both local and remote computer system storage media, including memory storage devices.

As shown in FIG. 9, computer system/server 902 in the example system 900 is shown in the form of a general-purpose computing device. The components of computer system/server 902 may include, but are not limited to, one or more processors or processing units (processor 904), a system memory 906, and a bus that couples various system components, including the system memory 906 to the processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. The system memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the system memory 906 may include at least one program product having a set (e.g., at least one) of program modules that are configured to carry out the functions of various embodiments of the application.

Program/utility 916, having a set (at least one) of program modules 918, may be stored in the system memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carries out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/ server 902 can communicate with one or more networks, such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/ server 902. Examples, include, but are not limited to: microcode, device drivers, redundant processing units, external disk drive arrays, RAID systems, tape drives, and data archival storage systems, etc.

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those that are disclosed. Therefore, although the application has been described based on these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus comprising:
   a data store of documents; and
   a processor coupled to the data store, the processor configured to:
   execute a communication session with a source device through a chatbot of a software application,
   determine to generate a letter based on dialog from the chat window,
   extract document content from a database based on the dialog;
   generate letter content based on execution of an artificial intelligence (AI) model on the dialog and the document content,
   convert the letter content into a digital document and transfer the digital document to a messaging application coupled to the AI model;

generate, by the messaging application, a digital message and attach the digital document thereto, and transmit, by the messaging application, the digital message to at least one of a phone number and an e-mail address associated with the source device.

2. The apparatus of claim 1, wherein the processor is configured to extract a snippet of document content from the database and execute the AI model on the snippet of document content to generate the letter content.

3. The apparatus of claim 1, wherein the processor is configured to identify a correlation between the dialog and the document content based on execution of the AI model on an identifier included in the dialog, and identify content related to the identifier within the database.

4. The apparatus of claim 1, wherein the processor is further configured to generate a text-based response based on execution of the AI model on the dialog and output the text-based response through the chatbot in the chat window of the software application.

5. The apparatus of claim 1, wherein the processor is further configured to look-up the e-mail address associated with the source device and transmit the digital message to the e-mail address via the messaging application, wherein an AI agent performs an action based on the digital message.

6. The apparatus of claim 1, wherein the processor is configured to identify a portion of content within the document content which corresponds to a topic within the dialog, extract the portion of content, and transmit the portion of content with the digital message.

7. The apparatus of claim 1, wherein the processor is further configured to identify the phone number of the source device and transmit the digital message to the phone number of the source device via the messaging application.

8. The apparatus of claim 1, wherein the processor is further configured to convert the letter content into a predefined file format.

9. A method comprising:

executing a communication session with a source device through a chatbot of a software application;

determining to generate a letter based on dialog from the chat window;

extracting document content from a database based on the dialog;

generating letter content based on execution of an artificial intelligence (AI) model on the dialog and the document content;

converting the letter content into a digital document and transferring the digital document to a messaging application coupled to the AI model;

generating, by the messaging application, a digital message and attaching the digital document to the digital message; and transmitting, by the messaging application, the digital message to at least one of a phone number and an e-mail address associated with the source device.

10. The method of claim 9, wherein the method further comprises extracting a snippet of document content from the database and executing the AI model on the snippet of document content to generate the letter content.

11. The method of claim 9, wherein the executing comprises identifying a correlation between the dialog and the document content based on execution of the AI model on an identifier included in the dialog and identifying content related to the identifier within the database.

12. The method of claim 9, wherein the method further comprises generating a text-based response based on execution of the AI model on the dialog and outputting the text-based response through the chatbot in the chat window of the software application.

13. The method of claim 9, wherein the method further comprises looking up the e-mail address associated with the source device and transmitting the digital message to the e-mail address via the messaging application, wherein an AI agent performs an action based on the digital message.

14. The method of claim 9, wherein the method further comprises identifying a portion of content within the document content which corresponds to a topic within the dialog, extracting the portion of content, and transmitting the portion of content with the digital message.

15. The method of claim 9, wherein the method further comprises identifying the phone number of the source device and the transmitting comprises transmitting the digital message to the phone number of the source device via the messaging application.

16. The method of claim 15, wherein the method further comprises converting the letter content into a predefined file format.

17. A non-transitory computer-readable storage medium comprising instructions stored therein which when executed by a processor cause a computer to perform:

executing a communication session with a source device through a chatbot of a software application;

determining to generate a letter based on dialog from the chat window;

extracting document content from a database based on the dialog;

generating letter content based on execution of an artificial intelligence (AI) model on the dialog and the document content;

converting the letter content into a digital document and transferring the digital document to a messaging application coupled to the AI model;

generating, by the messaging application, a digital message and attaching the digital document to the digital message; and transmitting, by the messaging application, the digital message to at least one of a phone number and an e-mail address of the source device.

18. The non-transitory computer-readable storage medium of claim 17, wherein the computer is further configured to perform extracting a snippet of document content from the database and executing the AI model on the snippet of document content to generate the letter content.

19. The non-transitory computer-readable storage medium of claim 17, wherein the processor is further configured to perform identifying a correlation between the dialog and the document content based on execution of the AI model on an identifier included in the dialog and identifying content related to the identifier within the database.

20. The non-transitory computer-readable storage medium of claim 17, wherein the computer is further configured to perform generating a text-based response based on execution of the AI model on the dialog and outputting the text-based response through the chatbot in the chat window of the software application.

* * * * *